US011795103B2

(12) United States Patent
Alder et al.

(10) Patent No.: US 11,795,103 B2
(45) Date of Patent: Oct. 24, 2023

(54) CHEMICALLY-STRENGTHENED THIN GLASS SUBSTRATES NEW PARADIGMS FOR MODIFIED CURVATURE AND METHODS OF MANUFACTURE

(71) Applicant: PGBC INTELLECTUAL HOLDINGS, LLC, Greenwood, AR (US)

(72) Inventors: Richard Ashley Alder, Fort Smith, AR (US); Russell Ashley Alder, Fort Smith, AR (US)

(73) Assignee: PGBC INTELLECTUAL HOLDINGS, LLC, Greenwood, AR (US)

( * ) Notice: Subject to any disclaimer, the term of this patent is extended or adjusted under 35 U.S.C. 154(b) by 440 days.

(21) Appl. No.: 16/651,518

(22) PCT Filed: Oct. 17, 2018

(86) PCT No.: PCT/US2018/056222
§ 371 (c)(1),
(2) Date: Mar. 27, 2020

(87) PCT Pub. No.: WO2019/079400
PCT Pub. Date: Apr. 25, 2019

(65) Prior Publication Data
US 2020/0299186 A1    Sep. 24, 2020

Related U.S. Application Data

(63) Continuation-in-part of application No. 15/786,343, filed on Oct. 17, 2017, now Pat. No. 10,457,586.

(51) Int. Cl.
*C03C 21/00* (2006.01)
*C03B 18/12* (2006.01)
(Continued)

(52) U.S. Cl.
CPC ............ *C03C 21/002* (2013.01); *C03B 18/12* (2013.01); *C03C 3/083* (2013.01); *C03C 3/087* (2013.01); *C03C 4/18* (2013.01); *C03C 2204/00* (2013.01)

(58) Field of Classification Search
None
See application file for complete search history.

(56) References Cited

U.S. PATENT DOCUMENTS 9,302,938 B2    4/2016    Kreski
2010/0009154 A1    1/2010    Allan et al.
(Continued)

FOREIGN PATENT DOCUMENTS

JP    7-223845 A    8/1995
JP    2011-527661 A    11/2011
(Continued)

OTHER PUBLICATIONS

Chinese Office Action and Search Report for Chinese Application No. 201880081536.7 dated Apr. 6, 2022, with English translation.
(Continued)

*Primary Examiner* — Jodi C Franklin
(74) *Attorney, Agent, or Firm* — Birch, Stewart, Kolasch & Birch, LLP

(57) ABSTRACT

Chemically-strengthened thin glass having modified curvature and a method for making the same. The method includes providing a thin glass substrate which has host alkali ions situated in its surface regions, and possesses a treatment-advantaged surface region and a treatment-disadvantaged surface region located opposing each other; conducting a step of ion-exchange with invasive alkali ions having an average ionic radius larger than the average ionic radius of the host alkali ions, thereby producing a chemically-strengthened substrate which is characterized by an unde-
(Continued)

sired curvature (warpage), and then conducting a step of reverse ion-exchange with reversing alkali ions having an average ionic radius equal to, or smaller than, the average ionic radius of the host alkali ions before ion-exchange, so as to produce a chemically-strengthened substrate having either less curvature or having a predetermined profile of curvature, which is not present in the chemically-strengthened glass substrate prior to reverse ion-exchange.

11 Claims, 6 Drawing Sheets

(51) Int. Cl.
*C03C 3/087* (2006.01)
*C03C 4/18* (2006.01)
*C03C 3/083* (2006.01)

(56) References Cited

U.S. PATENT DOCUMENTS

| | | | |
|---|---|---|---|
| 2010/0055141 A1* | 3/2010 | Richardson | C03C 21/008 106/401 |
| 2011/0281093 A1* | 11/2011 | Gulati | B32B 37/144 428/218 |
| 2011/0293928 A1 | 12/2011 | Chu et al. | |
| 2012/0194974 A1 | 8/2012 | Weber et al. | |
| 2013/0219965 A1* | 8/2013 | Allan | C03C 21/002 65/30.14 |
| 2014/0120335 A1 | 5/2014 | Yamanaka et al. | |
| 2014/0178663 A1 | 6/2014 | Varshneya et al. | |
| 2014/0178680 A1 | 6/2014 | Kreski | |
| 2014/0178689 A1 | 6/2014 | Kreski | |
| 2014/0178691 A1* | 6/2014 | Kreski | C03C 21/002 65/30.14 |
| 2014/0370304 A1* | 12/2014 | Axtell, III | B60J 1/00 428/428 |
| 2015/0030834 A1* | 1/2015 | Morey | C03C 3/097 73/12.06 |
| 2015/0239777 A1* | 8/2015 | Mauro | C03C 3/093 501/63 |
| 2016/0200628 A1 | 7/2016 | Shirai et al. | |
| 2016/0200629 A1 | 7/2016 | Ikawa et al. | |
| 2016/0326050 A1* | 11/2016 | Lee | C03C 21/002 |
| 2017/0174566 A1 | 6/2017 | Kreski | |
| 2018/0009697 A1* | 1/2018 | He | C03B 23/0307 |
| 2018/0009706 A1* | 1/2018 | Luo | C03C 21/002 |
| 2018/0370852 A1* | 12/2018 | Navet | C03C 21/002 |
| 2019/0112220 A1 | 4/2019 | Alder et al. | |
| 2020/0002225 A1* | 1/2020 | Schneider | C03C 3/097 |

FOREIGN PATENT DOCUMENTS

| | | |
|---|---|---|
| WO | WO 2010/005578 A1 | 1/2010 |
| WO | WO 2014/130515 A1 | 8/2014 |
| WO | WO 2014/157008 A1 | 10/2014 |
| WO | WO 2015/156262 A1 | 10/2015 |
| WO | WO 2016/014937 A1 | 1/2016 |
| WO | WO 2016/149860 A1 | 9/2016 |
| WO | WO-2016149860 A1 * | 9/2016 ............. C03C 17/23 |

OTHER PUBLICATIONS

Japanese Office Action for Japanese Application No. 2020-522326, dated May 18, 2021.
Canadian Office Action for Canadian Application No. 3,072,222, dated Jun. 11, 2021.
International Search Report, issued in PCT/US2018/056222, dated Jan. 22, 2019.
Written Opinion of the international Searching Authority, issued in PCT/US2018/056222, dated Jan. 22, 2019.
Japanese Office Action for Japanese Application No. 2020-522326, dated Mar. 15, 2022.
New Zealand Patent Examination Report for New Zealand Application No. 763864, dated Nov. 3, 2022.

* cited by examiner

REVERSE ION EXCHANGE

CHEMICALLY-STRENGTHENED THIN GLASS SUBSTRATES NEW PARADIGMS FOR MODIFIED CURVATURE AND METHODS OF MANUFACTURE

CROSS REFERENCE TO RELATED APPLICATIONS

This application is the National Phase of PCT International Application No. PCT/US2018/056222, filed on Oct. 17, 2018, which is a Continuation-in-Part of U.S. patent application Ser. No. 15/786,343, filed on Oct. 17, 2017, all of which are hereby expressly incorporated by reference into the present application.

FIELD OF THE INVENTION

The present invention relates generally to chemically-strengthened thin glass also sometimes referred to as chemically-tempered thin glass. More particularly, the present invention relates to thin glass substrates that have been chemically-strengthened by ion-exchange and which have been modified in curvature by subjecting at least a surface region thereof to a reverse ion-exchange process. The present invention also relates to chemically-strengthened thin glass substrates having reduced or zero curvature, chemically-strengthened thin glass substrates having a predetermined profile of curvature, and to advantageous manufacturing methods for such chemically-strengthened thin glass substrates.

BACKGROUND OF THE INVENTION

As is well recognized in the art, thin glass substrates which have been chemically-strengthened by an ion-exchange process are widely utilized in electronic devices, primarily as cover glasses on the displays of smart phones and tablets. Ion-exchange is a chemical process where host alkali metal atoms within the glass of a smaller ionic radius, typically sodium or lithium, are substituted at the atomic level by invasive alkali metal atoms of a larger ionic radius, typically potassium. Ion-exchange is conventionally conducted by immersing glass substrates in a salt bath, or tank of molten salt, containing potassium nitrate ($KNO_3$). The host alkali metal ions vacate from the glass surface region and the larger invasive alkali metal ions wedge into the voids causing the volume of the glass surface region to expand. Provided the temperature is below that at which the glass network structure can relax, a shallow but high-level of compressive stress is formed in the glass surface region. This compressive stress increases surface hardness to resist the formation of scratches, and forces closed microscopic flaws at or near the surface thereby reducing the likelihood of crack propagation on impact or load and thus greatly enhancing glass strength.

Glass substrates for chemical-strengthening by ion-exchange may be of any one of a number of alkali containing recipes where smaller host alkali metal ions are available in the glass surface region for substitution. Traditional soda-lime silicate glass, that which is encountered in common window glass, may be chemically-strengthened by ion-exchange. Other alkali containing glass recipes including alkali-aluminosilicate glass, alkali-borosilicate glass, alkali-aluminoborosilicate glass, alkali-boron glass, alkali-germinate glass, and alkali-borogermanate glass may also be chemically-strengthened by ion-exchange. The alkali-aluminosilicate glass may be a sodium alkali-aluminosilicate, or the less common lithium alkali-aluminosilicate, specifically formulated for "high ion-exchange" with sodium or lithium host-alkali metal atoms readily available in the surface region for rapid substitution. Such alkali-aluminosilicate glass recipes more quickly achieve high levels of surface region compressive stress (CS) and high depths of compressive layer (DOL) during the ion-exchange process.

Thin alkali containing glass substrates are currently manufactured by one of two primary methods or variants thereof, the fusion process and the float process.

The fusion process pioneered by CORNING® Incorporated of Corning N.Y. is used to produce thin substrates of alkali-containing glass, namely of sodium alkali-aluminosilicate recipes, which are commercially available in a thickness ranging from 0.4 mm to 2.0 mm. These substrates are collectively known by the trademark name of GORILLA Glass after being subject to chemical-strengthening by ion-exchange. The fusion process is an overflow down draw method where molten glass flows around a forming structure, or isopipe, creating two downwardly moving ribbons of glass which are fused into a single glass ribbon at the bottom of the forming structure, or root of the isopipe. The fused glass ribbon is pulled vertically downward away from the isopipe by a system of guide rollers while cooling. Upon cooling at the bottom end of the draw, individual glass substrates are cut from the vertically moving fused glass ribbon by a travelling anvil method to become raw sheets suitable for dimensional fabrication and strengthening by ion-exchange.

The fusion process manufactures thin glass substrates of good flatness and excellent optical quality. The opposing top surface regions of the molten glass ribbons which proceed downward on both sides of the isopipe and become the major outer surface regions of the fused glass ribbon are processed free of contact in the molten state and remain ultimately pristine. However, the fusion process is a slow and expensive process which is difficult to control across larger widths, for example greater than 2,000 mm, or when producing longer substrates which increase the weight of glass suspended beneath the isopipe. Cutting the downwardly moving glass ribbon requires steps be taken to minimize forces traveling upstream to where the ribbon remains in a softened state. The glass ribbon especially if wide or thin may be deliberately curved during the fusion process to simplify drawing but at a penalty of imparting differential annealing histories to the opposing glass surface regions. During later ion-exchange this differential results in a mild asymmetry of salt-ion diffusion between the opposing surface regions. One surface region is mildly "treatment-advantaged" compared to the other surface region being mildly "treatment-disadvantaged", both in the quantity of salt-ions entering the glass surface region and the depth to which such salt-ions progress.

The float process is also used to produce thin substrates of alkali containing glass. The Pilkington subsidiary of Nippon Sheet Glass Co., Ltd. (NSG) of Japan produces thin substrates of a soda-lime silicate glass recipe in thicknesses less than 3.0 mm to as thin as 1.0 mm thickness. These substrates in a thickness of 1.6 mm and thinner are collectively known by their trademark names of MICROFLOAT™ and MICROWHITE™ depending on the amount of iron present in their composition. Additionally, the Asahi Glass Co., Ltd. (AGC) of Japan has pioneered the use of the float process to produce thin substrates of a "high ion-exchange" sodium alkali-aluminosilicate recipe which are commercially available in a thickness ranging from thinner than 0.4 mm to thicker than 2.0 mm. These substrates are collectively known by their trademark names of DRAGONTRAIL® and LEOFLEX® after being subject to chemical-strengthening by ion-exchange. The float process is a horizontal production method where molten glass flows over a weir and onto the top of liquid tin metal, or a float bath, from where it is pulled as a ribbon which may be further thinned by additional drawing. The horizontally moving glass travels through an annealing lehr (i.e., a temperature-controlled kiln for annealing glass objects) and is then cut into raw sheets suitable for dimensional fabrication and strengthening by ion-exchange.

The float process allows the manufacture of thin glass substrates of excellent flatness and good optical quality. The glass ribbon can be larger widths, for example 3,300 mm, and since the cutting process occurs many meters downstream from where the softened ribbon of glass is exiting the float bath, substrates may be readily cut in longer lengths without impact to upstream glass. Furthermore, the float process allows for the efficient production of high glass tonnages at low cost. However, substrates produced by the float process suffer from a distinct and ubiquitous problem, a microscopic layer of tin remains embedded in the glass. While tin from the bath can be found in both major surface regions of float produced glass, the lower surface region in direct contact with the metallic tin bath, the tin side, acquires substantially more tin contamination than the upper surface region, known in the art as the non-tin side. During later ion-exchange this differential results in a substantive asymmetry of salt-ion diffusion between the opposing surface regions. Thus on thin glass which is produced by an unadulterated float process, the non-tin side surface region is "treatment-advantaged" compared to the tin side surface region being "treatment-disadvantaged", both in the quantity of salt-ions entering the glass surface region and the depth to which such salt-ions progress.

Larger invasive salt-ions crowd into the surface regions of the glass substrate during ion-exchange compressing the surface regions and causing a simultaneous expansion in their volume. When the salt-ion uptake is asymmetrical between the opposing major surface regions then the expansion of each major surface region occurs by differing amounts. Both expanded surface regions pivot about a central region of tension with the resulting dimensional differences being accommodated by deformation of the thin glass substrate into a curved body (also referred to as bow or bend or warpage). That is, the asymmetry of salt-ion diffusion during ion-exchange causes thin chemically-strengthened glass substrates to develop a curvature, deviating in shape from that of a true flat plane.

Curvature may be defined as the difference in distance on the z-axis exceeding that of glass thickness between higher and lower points on the substrate from an imaginary flat plane bisecting the thickness centerline. The differential tin contamination of the surface regions in thin float produced glass causes a curvature which is an order of magnitude greater than that which occurs due to differential annealing histories on the surface regions of fusion drawn glass. Indeed, typically when a thin substrate of sufficient size is made by the float process, following ion-exchange, it becomes noticeably concave in shape on the tin-side, convex in shape on the non-tin side, and thereby resembles a shallow dish.

Outside obvious aesthetic requirements for flatness, control of curvature out-of-plane in thin chemically-strengthened substrates is a definitive functional requirement for many glass applications. For touch displays, a thin glass substrate is generally assembled as a component to a multi-layer stack where curvature may cause gapping between layers resulting in irregularities of luminance or Newton rings. For electronics or solar applications, curvature may complicate the adhesion and quality level of applied films or coatings such as indium tin oxide. Architectural and transportation applications typically require thin chemically-strengthened glass substrates be laminated to another substrate of glass, or adhered to an object, for which curvature may cause edge curl or ripple formations. Even when thin glass is used as a layer within an insulating glass unit (IGU) or vacuum insulating glass (VIG) to create an additional hermetically sealed void, a warped substrate may experience a washboard effect where the direction of curvature reverses under load or the sidewalls of cavities are in unacceptable contact.

PRIOR ART METHODOLOGIES

The prior art contains numerous efforts to reduce the curvature caused by the unbalanced expansion of major glass surface regions during ion-exchange, especially that of the magnitude which occurs with float produced glass. Such efforts can be divided into two groups. Firstly there has been a group of methods disclosed aimed at reducing the uptake salt-ions in the treatment-advantaged surface region, the non-tin side with minimal tin contamination on float produced glass substrates. Secondly there has been a group of methods aimed at increasing the uptake of salt-ions in the treatment-disadvantaged side, the tin side with major tin contamination on float produced glass substrates. The goal of each of these methods, albeit by a different set of approaches, has been to promote greater balance in invasive ion uptake into the opposing surface regions during ion-exchange so the level of curvature may be reduced.

The prior art reflects a wide variety of methods for controlling curvature in thin chemically-strengthened glass substrates employing various approaches. Documents disclosing some prior art methods are listed below.

U.S. Pat. No. 9,302,938 (Kreski US '938) discloses a chemically-strengthened glass and a method for making utilizing differential areal density. The method includes providing an ion-exchange medium characterized by having an areal density of invasive alkali ions and a modified ion-exchange medium characterized by having a modified areal density of invasive alkali ions and conducting ion-exchange to produce the strengthened substrate.

In Kreski US '938, a deductive approach is provided. Its differential density method puts forward the use of a salt paste containing clay particles to reduce the overall concentration of invasive salt ions presented to the treatment-advantaged surface region. However what is not stated is that it is extremely difficult to keep such clay particles homogeneously diffused within the salt paste during ion-exchange. Such clay particles may migrate toward or away from the glass surface region producing uneven results. Furthermore, the clay particles may adhere to the outer face of the glass surface region and thus may be difficult to clean away following ion-exchange. Finally, the quantity of clay particles added to the paste on the treatment-advantaged surface region is inevitably predictive in nature. Should the rate of invasive ion uptake fluctuate on the ion-exchanged surface regions, which it can do, then such a zero point is dynamic and requires constant adjustment of the concentration of clay particles differentially applied to the ion-exchange surface regions. Additionally such adjustments are time consuming and uneconomical given the method requires long hours of salt paste preparation, application, and drying time additional to the period of ion-exchange US 2014/0178691 (Kreski US '691) discloses a chemically-strengthened glass and a method for making utilizing differential chemistry. The method includes providing an ion-exchange medium characterized by a composition associated with an ion-exchange rate of invasive alkali ions and a modified ion-exchange medium including a modified composition associated with a modified ion-exchange rate of the invasive alkali ions and conducting ion-exchange to produce the strengthened substrate.

Kreski US '691 in its differential chemistry disclosure reveals adding a "poison" to a salt paste applied to the treatment-advantaged surface region. For example he puts forward mixing a "poisoning" additive of sodium nitrate ($NaNO_3$) or calcium nitrate ($Ca(NO_3)_2$) in with the potassium nitrate ($KNO_3$) paste to reduce the uptake of larger potassium ions during the ion-exchange process. Similar to the differential density patent, the clay particles used as rheological agent in the paste may be difficult to remove after ion-exchange. Again this deductive method postulates that the zero point of symmetrical uptake of larger invasive ions may be correctly predicted prior to ion-exchange. However the correctness of such a prediction without knowledge of the actual practical differences in the uptake of invasive ions between the ion-exchanged surface regions prior to completion offers no simple or economic steps for remediation if such a prediction proves to be inaccurate.

US 2016/0200629 (Ikawa et al. US '629) discloses a method for manufacturing float glass where in the forming step a fluid containing a molecule having a fluorine atom is sprayed onto the glass ribbon. That is, the application of molecules containing fluorine is another method which has been offered for reducing the uptake of salt-ions in the treatment-advantaged surface region of float glass during ion-exchange.

Ikawa et al. US '629 discloses where fluorine atoms are added to the non-tin side in the float bath to reduce later reactivity with salt-ions during the ion-exchange process. The disclosure describes what is stated by the inventors to be a complex phenomenon of fluorine promoted relaxation of compressive stress, inhibition of ion-exchange, de-alkalization, molecular changes to the glass structure, and dehydration. However the application of fluorine, for example by hydrofluoric gas, induces a tradeoff between adequate fluorine concentration within the glass and pitting damage to the glass surface. Fluorine containing compounds are caustic to the refractory lining of the tin bath and may induce the formation of stones in the molten glass. Also, the addition of fluorine atoms occurs during the forming stage of a continuously drawn glass ribbon and is thus removed by both time and tonnage from the much later process of ion-exchange. If the fluorine concentration is found to be inadequate for achieving symmetry between ion-exchanged surface regions during later chemical-strengthening then at best future production may be adjusted and at worst a large quantity of glass may need to be discarded.

US 2011/0293928 (Chu et al. US '928) discloses a method for strengthening glass whereby a barrier film is formed on a glass surface region to limit the quantity of ions entering during ion-exchange strengthening with the intention of controlling curvature. Such a film is taught as being composed of silicon dioxide ($SiO_2$), titanium dioxide ($TiO_2$), tantalic oxide ($Ta_2O_5$), or niobium oxide ($Nb_2O_5$).

However, the formation of a metallic barrier film on all or part of the treatment-advantaged surface region to reduce the quantity of ions entering during ion-exchange is also less desirable. A metallic barrier film is vulnerable to damage due to handling of the glass substrates after coating. Also the metallic barrier film may be degraded by the thermal profile of time at temperature to which the glass is exposed during ion-exchange. Additionally other coatings or films may be applied on the non-tin side after ion-exchange and the metal barrier layer may interfere with their application or longevity. Finally barrier film methods, and indeed any others within the group, are inevitably deductive based on the overall quantity of salt-ions entering a surface region of the glass substrate and therefore a constant risk remains that surface region compressive stress may be insufficient or uneven potentially resulting in localized weakness and unsatisfactory curvature control.

US 2014/0178689 (Kreski US '689) discloses a chemically-strengthened glass and a method for making utilizing differential time. The method includes applying an ion-exchange medium including invasive alkali ions to a surface region of the treatment-rich volume for a period of time and applying the ion-exchange medium to a surface region of the treatment-poor volume for a modified period of time and conducting ion-exchange to produce the strengthened substrate.

Kreski US '689 in its differential time disclosure teaches extending the time by which the treatment-disadvantaged surface region is subject to invasive ions as another method to increase its salt ion uptake. It discloses applying a salt paste containing potassium nitrate and clay to the tin side which is then subjected to an extended time period of ion-exchange over and above that to which the non-tin side is subjected. However such a method inevitably extends the time required to complete the ion-exchange process over and above the long application and drying time of the clay salt paste. Additionally the method is subject to the variations imbued by the mobility of the clay particles themselves and cleaning the clay particles from the glass after ion-exchange is problematic. Finally like his other two methods provided in Kreski US '691 and Kreski US '938, the primary criticism is that such a method is innately predictive as to the amount of curvature which will be encountered and the additional time necessary for it to be offset. Should such a prediction prove inaccurate no simple and economic means are presented for remediation.

US 2014/0178663 (Varshneya et al. US '663) discloses a method for manufacturing chemically-strengthened glass with reduced induced curvature and a method of making utilizing heat-treatment. The method includes heating the provided substrate to a heat-treating temperature for a heat-treating period to produce a heat-treated substrate then applying an ion-exchange medium including invasive alkali ions and conducting ion-exchange to produce the strengthened substrate with reduced induced curvature.

Varshneya et al. US '663 put forward a method in its heat-treatment disclosure which seeks to increase the uptake of salt-ions in the treatment-disadvantaged surface region. This method teaches thin glass substrates may be soaked at a high-temperature for a period of time in order to oxidize the tin metal in float produced glass. It is noted that such heat-treatment can at best only reduce the amount of curvature incurred during later ion-exchange. It is not possible with this method to eliminate curvature (warpage). Additionally heat-treatment for a specified period of time consumes additional energy and extends the production time. Furthermore, it is difficult to conduct in a production environment due to the need to load and unload weaker, and not strengthened, thin glass substrates to a heat-treating furnace prior to ion-exchange without incurring breakage or damage to the surface regions.

US 2014/0120335 (Yamanaka et al. US '335) discloses methods to reduce curvature in chemically-strengthened float glass by decreasing the difference between the compressive stress of the tin versus non-tin side in the float glass itself by slowing conveyance speed, polishing or etching the glass ribbon, and performing an annealing treatment on reheated float glass.

Physically removing the tin invaded layer of the surface region in float produced glass is a method which has been put forward to increase the uptake of salt-ions in the treatment-disadvantaged surface region during ion-exchange. In this method, the part of the surface region containing the metallic tin metal is laboriously ground and polished away. However, the invasive tin exists in the glass surface regions in higher quantities to a depth up to 5 µm, and in lower quantities to a depth of as much as 20 µm. Grinding and polishing across the entire surface region of a glass substrate to such a depth is difficult to accomplish without breakage. Secondly, defects may be introduced into the glass surface region which results in additional flaws which ion-exchange is simply attempting to force closed. Thirdly, physical removal of a surface region layer may result in unintended variations to the thickness of the glass substrate. Finally and most unfavorably, such a method is expensive and thus an impractical alternative to fusion produced thin glass substrates.

WO 2015/156262 (Nakagawa et al. WO '262) discloses a method for manufacturing chemically-strengthened glass where a salt paste is applied simultaneously to all surface regions of the glass substrate followed by firing of the substrate in a furnace with different thermal profiles applied to each surface region of the glass so as to incur varying levels of ion-exchange to balance compressive stress so as to reduce curvature.

The use of differential surface region temperatures during ion-exchange is another method which has been disclosed to increase the uptake of salt-ions in the treatment-disadvantaged surface region during ion-exchange. A salt paste containing potassium is applied across all surface regions of the glass and the substrate is moved into a furnace with plates of differing heat-capacity placed against one or both major glass surface regions to subject each surface region to a differential thermal profile of time at temperature. Since the uptake of salt-ions is increased at higher temperatures, the goal is to balance the overall uptake of ions between the surface regions by exposing each major surface region simultaneously to a differing thermal profile. However the application of plates against the glass surface regions may result in scratches or abrasions. Furthermore, such a method relies on an accurate control of temperature on each ion-exchanged surface region which is difficult to achieve in a furnace environment especially given the small distance between surfaces in a thin substrate.

WO 2014/130515 (Allan et al. WO '515) discloses methods for quantifying the asymmetry of glass substrates produced by a particular manufacturing process after undergoing ion-exchange strengthening.

Thus, despite numerous prior attempts at perfecting flatness in thin glass substrates which are chemically-strengthened by a process of ion-exchange, the issue of curvature (or bow or bend or warpage) remains.

Each of the following United States Patents and United States Patent Publications, which are discussed above in the background disclosure, are herein incorporated-by-reference in their entirety:

U.S. Pat. No. 9,302,938 (Kreski US '938),
US 2011/0293928 (Chu et al. US '928),
US 2014/0120335 (Yamanaka et al. US '335),
US 2014/0178663 (Varshneya et al. US '663),
US 2014/0178691 (Kreski US '691),
US 2014/0178689 (Kreski US '689), and
US 2016/0200629 (Ikawa et al. US '629)

SUMMARY OF THE INVENTION

Based on the above noted deficiencies in the art, there are herein noted various non-limiting objects of the invention for overcoming such deficiencies, which non-limiting objects include at least the following.

A reduction in the amount of curvature on float produced substrates after chemical-strengthening by ion-exchange is an object of this invention. A reduction in the amount of curvature by an order of magnitude on float produced substrates to a level equivalent to the curvature on fusion produced substrates not subject to remediation is an object of the invention. A reduction in the amount of curvature on float produced substrates to a level less than the curvature on fusion produced substrates not subject to remediation is an object of the invention. A reduction in the amount of curvature on fusion and float produced substrates to a level less than the curvature on fusion produced substrates not subject to remediation is an object of this invention.

Additionally, it is an object of this invention that such a reduction to curvature is accomplished efficiently with regards to both time and cost. It is also an object of the invention that reductions to curvature exact a minimal penalty to the level and depth of surface region compressive stress compared to that achievable where no attempt is made to mitigate curvature. Furthermore, it is an object of the invention that if the amount of reduction to the curvature is found insufficient then a simple and economic means is available to undergo additional remediation. Additionally, it is an object of the invention that a chemically-strengthened substrate may instead be purposefully produced with a predetermined profile of curvature which was not present in the chemically-strengthened glass substrate prior to reverse ion-exchange. A further object of this invention is the methods disclosed are of suitable utility to permanently alter a chemically-strengthened thin glass sheet exhibiting a curvature, regardless as to the cause of such curvature, to exhibit under equivalent conditions a reduced curvature (enhanced flatness), zero curvature (flatness), or a predetermined profile of curvature (curvature to a shape within a predetermined band of dimensional tolerance). Finally, the creation of improved chemically-strengthened thin glass substrates and advantageous methods for their manufacture utilizing therein reverse ion-exchange are objects of this invention.

In one embodiment of the invention, an inventive method is provided for making a chemically-strengthened thin glass substrate that includes changing the chemical structure of one or more surface regions of the thin glass substrate. The chemical structure of the thin glass substrate contains host alkali ions having an average ionic radius present in the surface region, with the substrate containing both a "treatment-advantaged surface region" and a "treatment-disadvantaged surface region" that oppose each other, such as typically due to formation of the thin glass substrate by a float process.

In the inventive method, an ion-exchange medium, including invasive alkali ions having an average ionic radius larger than the average ionic radius of the host alkali ions, is applied to the glass surface regions, and ion-exchange is conducted while applying the ion-exchange medium to the glass surface regions of the thin glass substrate, thereby producing a chemically-strengthened glass substrate.

In the inventive method, a reverse ion-exchange medium is applied to at least a surface region of the chemically-strengthened glass substrate. The reverse ion-exchange medium includes alkali ions having an average ionic radius that is equal to, or smaller than, the average ionic radius of host alkali ions before ion-exchange. More preferably in the inventive method, a reverse ion-exchange medium is applied to at least one major surface region of the chemically-strengthened glass substrate. Still more preferably in the inventive method, a reverse ion-exchange medium is applied to at least the totality of one major surface region of the chemically-strengthened glass substrate. Even more preferably in the inventive method, a reverse ion-exchange medium is applied to at least one major surface region of the chemically-strengthened glass substrate which is not subject to dimensional fabrication such as cutting and/or the addition of perforations. Most preferably in the inventive method, a reverse ion-exchange medium is applied to at least the totality of one major surface region of the chemically-strengthened glass substrate but excluding those areas subject to dimensional fabrication such as cutting and/or the addition of perforations.

In particular, the inventive method comprises applying a reverse ion-exchange medium to at least a treatment-advantaged surface region, and conducting reverse ion-exchange while applying the reverse ion-exchange medium to produce a chemically-strengthened substrate with reduced or zero curvature—that is, with less curvature (or bow or bend or warpage) than was present in the chemically-strengthened glass substrate prior to reverse ion-exchange.

Alternatively, the inventive method comprises applying a reverse ion-exchange medium to at least one of a treatment-advantaged surface region or treatment-disadvantaged surface region on a chemically-strengthened glass substrate, and conducting reverse ion-exchange while applying the reverse ion-exchange medium to produce a chemically-strengthened substrate with a predetermined profile of curvature that is different from that present in the chemically-strengthened glass substrate prior to carrying out the reverse ion-exchange.

In another embodiment of the invention there is provided an article of a thin glass substrate with reduced or zero curvature that has been chemically-strengthened by ion-exchange and then having select strengthening compressive stresses slightly relaxed by applying a reverse ion-exchange medium and conducting reverse ion-exchange to at least a treatment-advantaged surface region thereof that has been chemically-strengthened by ion-exchange.

In another embodiment of the invention, there is provided an article of a thin glass substrate with reduced or zero curvature that has been chemically-strengthened by ion-exchange and then having select strengthening compressive stresses slightly relaxed by applying a reverse ion-exchange medium and conducting reverse ion-exchange to at least a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. The treatment-disadvantaged surface region and the treatment-advantaged surface region each contain alkali metal ions extending to a diffusion depth which are in a concentration greater in the surface regions than in the remaining glass substrate. In one embodiment of the article, the treatment-disadvantaged surface region contains tin ions in a concentration greater than in the treatment-advantaged surface region. In another embodiment of the article, the treatment-disadvantaged surface region has a different annealing history than the treatment-advantaged surface region. In a depth extending from the surface to about 5 µm, the average ionic radius of the alkali metal ions located in the treatment-disadvantaged surface region is greater than the average ionic radius of the alkali ions located in the treatment-advantaged surface region, and in a depth extending from about 5 µm to the depth of diffusion, the average ionic radius of the alkali metal ions located in the treatment-advantaged surface region is greater than the average ionic radius of the alkali ions located in the treatment-disadvantaged surface region.

In another embodiment of the invention, there is provided an article of a thin glass substrate with reduced or zero curvature that has been chemically-strengthened by ion-exchange and then having select strengthening compressive stresses slightly relaxed by applying a reverse ion-exchange medium and conducting reverse ion-exchange to at least a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. In a float produced glass substrate, the treatment-disadvantaged surface region and the treatment-advantaged surface region each contain tin ions. In one embodiment of the article, the treatment-disadvantaged surface region contains tin ions in a concentration greater than in the treatment-advantaged surface region. In another embodiment of the article, a float produced glass substrate also contains fluorine ions in each of the opposing surface regions, and that surface which contains tin ions in a greater concentration is opposed to that surface which contains fluorine ions in a greater concentration. In a depth extending from the surface to about 5 µm, the mass of the invasive alkali ion species located in the treatment-disadvantaged surface region is greater than the mass of the invasive alkali ion species located in the treatment-advantaged surface region, and in a depth extending from about 5 µm to the depth of diffusion, the mass of the invasive alkali ion species located in the treatment-advantaged surface region is greater than the mass of the invasive alkali ion species located in the treatment-disadvantaged surface region.

In another embodiment of the invention there is provided an article of a thin glass substrate with a predetermined profile of curvature that has been chemically-strengthened by ion-exchange and then having select strengthening compressive stresses slightly relaxed by applying a reverse ion-exchange medium and conducting reverse ion-exchange to at least a treatment-advantaged surface or a treatment-disadvantaged surface region thereof that has been chemically-strengthened by ion-exchange.

In another embodiment of the invention, there is provided an article of a thin glass substrate with a predetermined profile of curvature, that has been chemically-strengthened by ion-exchange and then having select strengthening compressive stresses slightly relaxed by applying a reverse ion-exchange medium and conducting reverse ion-exchange to a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. The treatment-disadvantaged surface region and the treatment-advantaged surface region each contain alkali metal ions extending to a diffusion depth which are in a concentration greater in the surface regions than in the remaining glass substrate. In one embodiment of the article, the treatment-disadvantaged surface region contains tin ions in a concentration greater than in the treatment-advantaged surface region. In another embodiment of the article, the treatment-disadvantaged surface region has a different annealing history than the treatment-advantaged surface region. In a depth extending from the surface to about 5 μm, the average ionic radius of the alkali metal ions located in the treatment-disadvantaged surface region is greater than the average ionic radius of the alkali ions located in the treatment-advantaged surface region, and in a depth extending from about 5 μm to the depth of diffusion, the average ionic radius of the alkali metal ions located in the treatment-advantaged surface region is greater than the average ionic radius of the alkali ions located in the treatment-disadvantaged surface region.

In another embodiment of the invention, there is provided an article of a thin glass substrate with a predetermined profile of curvature that has been chemically-strengthened by ion-exchange and then having select strengthening compressive stresses slightly relaxed by applying a reverse ion-exchange medium and conducting reverse ion-exchange to a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. In a float produced glass substrate, the treatment-disadvantaged surface region and the treatment-advantaged surface region each contain tin ions. In one embodiment of the article, the treatment-disadvantaged surface region contains tin ions in a concentration greater than in the treatment-advantaged surface region. In another embodiment of the article, a float produced glass substrate also contains fluorine ions in each of the opposing surface regions, and that surface which contains tin ions in a greater concentration is opposed to that surface which contains fluorine ions in a greater concentration. In a depth extending from the surface to about 5 μm, the mass of the invasive alkali ion species located in the treatment-disadvantaged surface region is greater than the mass of the invasive alkali ion species located in the treatment-advantaged surface region, and in a depth extending from about 5 μm to the depth of diffusion, the mass of the invasive alkali ion species located in the treatment-advantaged surface region is greater than the mass of the invasive alkali ion species located in the treatment-disadvantaged surface region.

In a further embodiment of the invention, there is provided an article of manufacture made by a process such as herein described which includes a chemically-strengthened thin glass substrate having less curvature than was present in the chemically-strengthened glass substrate prior to reverse ion-exchange.

In yet a further embodiment of the invention, there is an article of manufacture made by a process such as herein described which includes a chemically-strengthened substrate having a predetermined profile of curvature which was not present in the chemically-strengthened glass substrate prior to reverse ion-exchange.

The above summary is not intended to describe each embodiment or every implementation of the invention. Further features and various advantages are outlined in the accompanying drawings and the following detailed description of the invention.

BRIEF DESCRIPTION OF THE DRAWINGS

The drawings which accompany this application form part of the disclosure, but are illustrative only, and should not be construed as limiting the scope of the invention, which scope is defined by the appended claims. In the drawings:

DETAILED DESCRIPTION OF THE INVENTION

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily or unduly limit the description. Furthermore, different embodiments are described below. The embodiments may be used separately or performed together in different combinations, as will be readily recognized by those having ordinary skill in the art.

The present invention provides a method that is useful for making chemically-strengthened thin glass substrates, which is particularly advantageous for producing chemically-strengthened thin glass with less curvature (i.e., having zero curvature or reduced curvature). The provided method also allows one to modify the curvature present in a chemically-strengthened thin glass substrate to thereby arrive at a predetermined profile of curvature. Furthermore, a chemically-strengthened glass substrate is provided, which having been treated with a reverse ion-exchange process in accordance with the provided inventive methods fully avoids many of the problems and difficulties that have been previously encountered in producing chemically-strengthened thin glass substrates having reduced or zero curvature, or alternatively having a predetermined profile of curvature.

Figure 1:
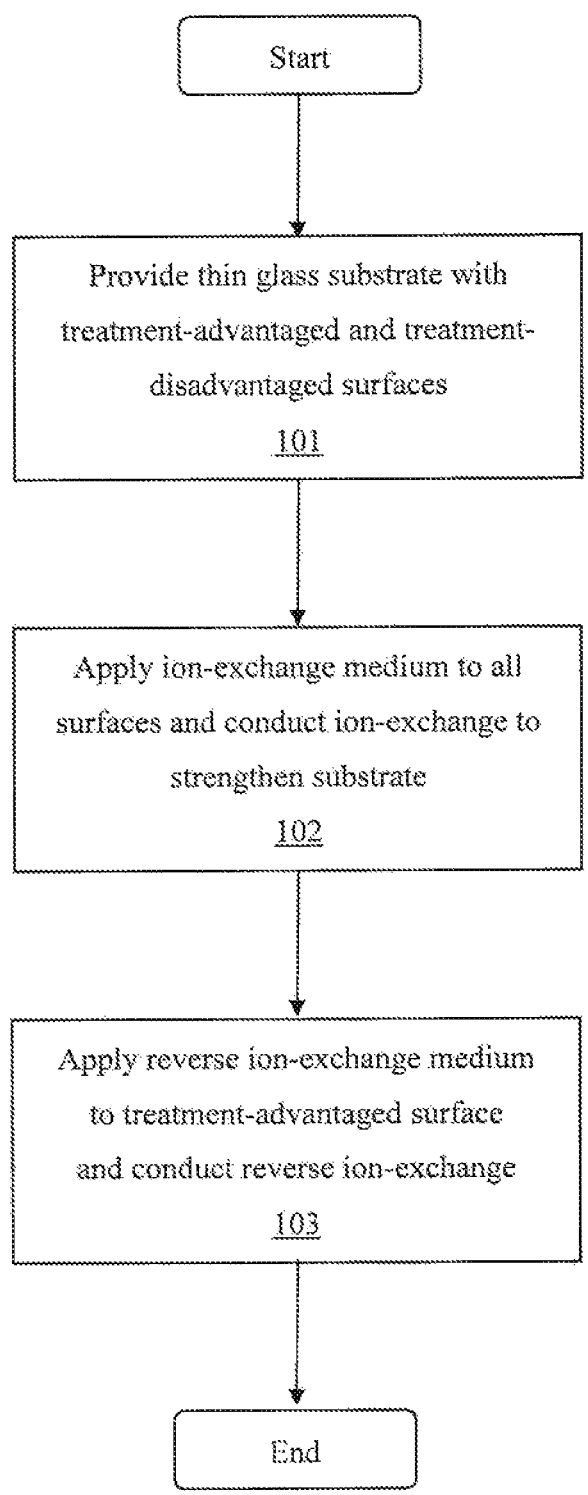
FIG. 1 is a flowchart illustrating an exemplary method of the present invention.

FIG. 1 is a flowchart illustrating an exemplary overview of an implementation described within the disclosure.

As shown in FIG. 1, at step 101, a thin glass substrate is provided that contains a treatment-advantaged surface region and a treatment-disadvantaged surface region.

The thin glass substrate has host alkali ions having an average ionic radius situated in the surface region. The glass substrate has a treatment-advantaged surface region and a treatment-disadvantaged surface region located opposing each other. There is provided an ion-exchange medium which includes invasive alkali ions having an average ionic radius that is larger than the average ionic radius of the host alkali ions being substituted.

At step 102, an ion-exchange medium is applied to the surfaces and ion-exchange is conducted to chemically-strengthen the thin glass substrate. The ion-exchange medium being typically applied to the edges and both of the glass surface regions (i.e., the treatment-advantaged surface region and a treatment-disadvantaged surface region that are located opposing each other) and ion-exchange being conducted, there is produced a chemically-strengthened thin glass substrate which ordinarily reveals a curvature in its dimensional characteristics.

At step 103, a reverse ion-exchange medium is applied to at least the treatment-advantaged surface region and reverse ion-exchange is conducted. The reverse ion-exchange medium contains reversing alkali ions having an average ionic radius that is equal to, or smaller than, the average ionic radius of the host alkali ions before ion-exchange, and it is normally applied to the "treatment-advantaged surface region" and reverse ion-exchange is conducted in order to reduce curvature in the chemically-strengthened substrate.

Figure 5:
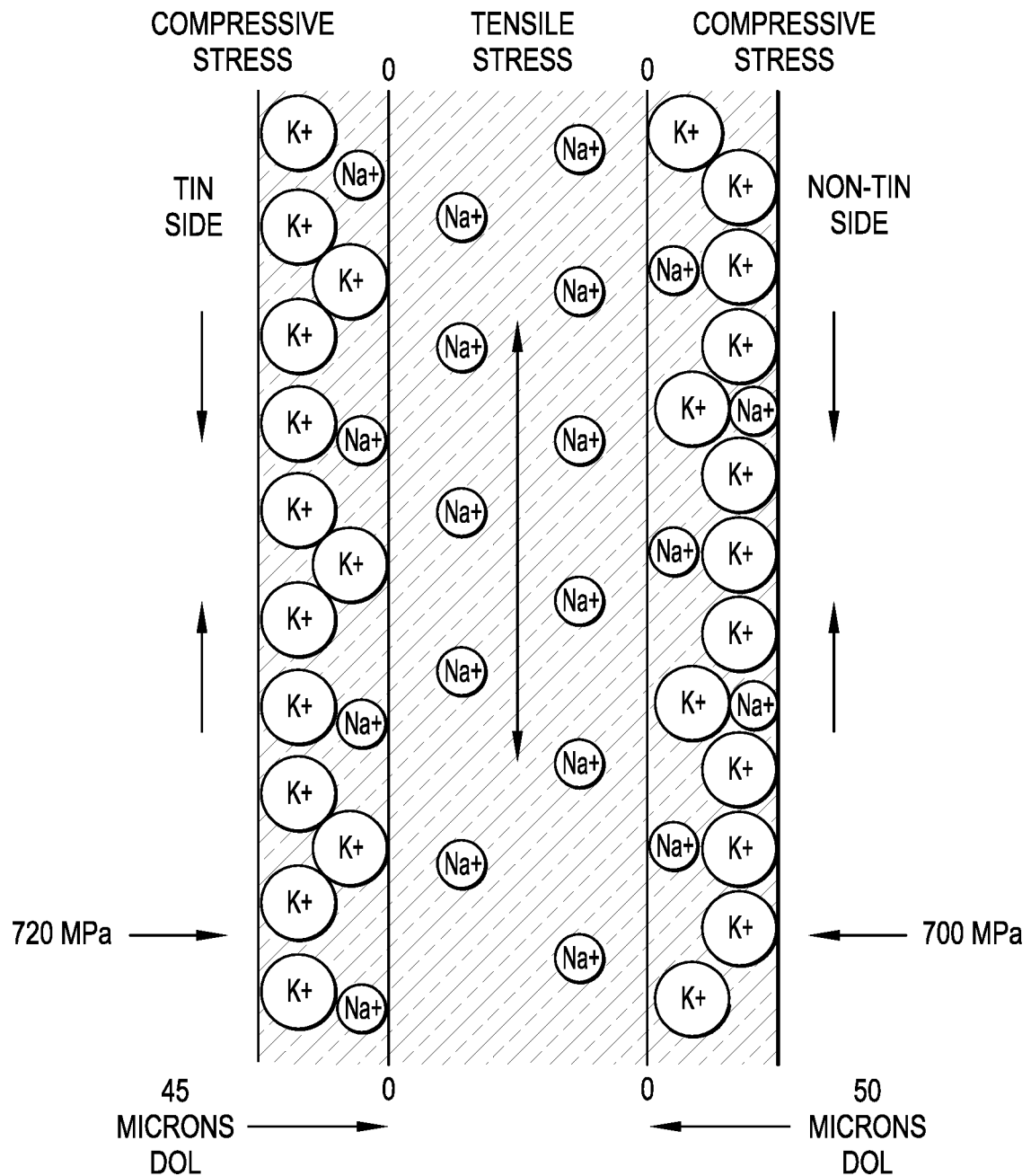
FIG. 5 depicts a cross-section of a chemically-strengthened thin glass sheet of the present invention, and illustrates hypothetical relative ion concentrations and compressive forces present in the chemically-strengthened thin glass sheet of the invention, and wherein the thin glass sheet is one that is prepared by a tin float process.

While the reverse ion-exchange medium is applied, in step 103, a slight relaxation of compressive stresses occurs in the first about 5 μm or less of the treatment-advantaged surface region. The chemically-strengthened substrate which results has less induced curvature resulting from the step of ion-exchange because of the reverse ion-exchange process. Without wishing to be bound by theory, it appears conducting a step of reverse ion-exchange on the treatment-advantaged surface region of a chemically-strengthened glass substrate reduces the sum total of compressive stress in the treatment-advantaged surface region to the lower level of compressive stress in the treatment-disadvantaged surface region, thereby nullifying the curvature added by the step of ion-exchange which would otherwise be present in the chemically-strengthened glass substrate. FIG. 5 is a sketch depicting such compressive stress in a glass substrate.

Alternatively, in much the same way that reducing the curvature in a chemically-strengthened thin glass substrate can be achieved by way of the inventive methods, so also the achievement of a predetermined profile of curvature can be imparted to a previously chemically-strengthened thin glass substrate, by use of a method of the instant invention, wherein a process of reverse ion-exchange is carried out on at least one of a treatment-advantaged surface region or a treatment-disadvantaged surface region of a chemically-strengthened glass substrate. The thin glass substrate may additionally be heated above the softening temperature of the glass and thermally bent to the shape of a mold or tool to impart an initial profile of curvature prior to the steps of ion-exchange and reverse ion-exchange.

The operation and effects of certain embodiments can be more fully appreciated from the examples, as described below. The embodiments on which these examples are based are representative only. The selection of these embodiments to illustrate the principles of the invention does not indicate that materials, components, reactants, conditions, techniques, configurations and designs, etc., which are not described in the examples are not suitable for use, or that subject matter not described in the examples is excluded from the scope of the appended claims or their equivalents. The significance of the examples may be better understood by comparing the results obtained therein with potential results which may be obtained from tests or trials that may be, or may have been, designed to serve as controlled experiments and to provide a basis for comparison.

Exemplary Thin Glass Substrates

As used herein a glass substrate means any kind of ion-exchangeable glass. Ion-exchangeable is defined to mean a glass capable of exchanging host alkali ions, or those alkali metal ions located in the glass structure at or near the surface. Exemplary alkali-containing glasses including alkali-aluminosilicate glass, soda-lime silicate glass, alkali-borosilicate glass, alkali-aluminoborosilicate glass, alkali-boron glass, alkali-germinate glass, and alkali-borogermanate glass may be chemically-strengthened by ion-exchange. Glass of an alkali-aluminosilicate recipe may be further termed as a sodium alkali-aluminosilicate or a lithium alkali-aluminosilicate depending upon which species of host alkali ion is present within the glass chemical structure.

Such alkali containing glass substrates which are the subject of this disclosure may be further defined as those which are thin, typically being less than 3.0 mm in thickness, and more preferably 2.0 mm in thickness or thinner. Thin glass substrates may for example possess a thickness of 2.7 mm, 2.5 mm, 2.0 mm, 1.6 mm, 1.5 mm, 1.3 mm, 1.1 mm, 1.0 mm, 0.85 mm, 0.8 mm, 0.7 mm, 0.55 mm, 0.4 mm, and have even been manufactured as thin as 0.1 mm (100 μm) and 0.05 mm (50 μm). At thicknesses of 3.0 mm or greater, the glass substrate can typically gain enough rigidity that curvature ceases to be induced during chemical-strengthening by ion-exchange. At a thickness of 1.5 mm or thinner, curvature can typically become a problem of substantial magnitude as the rigidity of glass sheets to resist flexure declines as a function of the cube of the substrate thickness.

An exemplary embodiment of a recipe/formulation for a sodium alkali-aluminosilicate glass contains 60-65 mol % $SiO_2$, 10-15 mol % $Na_2O$, 10-15 mol % $Al_2O_3$, 6-9 mol % MgO, 4-8 mol % $K_2O$, and 0.5-2.0 mol % $ZrO_2$.

Another suitable recipe/formulation for a sodium alkali-aluminosilicate glass contains 66.7 mol % $SiO_2$, 13.8 mol % $Na_2O$, 10.5 mol % $Al_2O_3$, 5.5 mol % MgO, 2.06 mol % $K_2O$, 0.64 mol % $B_2O_3$, 0.46 mol % CaO, 0.34 mol % $As_2O_3$, 0.01 mol % $ZrO_2$, and 0.007 mol % $Fe_2O_3$.

In another suitable embodiment, a recipe/formulation for a sodium alkali-aluminosilicate glass contains 66.9 mol $SiO_2$, 10.1 mol $Al_2O_3$, 8.39 mol % $K_2O$, 7.45 mol % $Na_2O$, 5.78 mol % MgO, 0.58 mol % $B_2O_3$, 0.58 mol % CaO, 0.2 mol % $SnO_2$, 0.01 mol % $ZrO_2$, and 0.01 mol % $Fe_2O_3$.

In another embodiment, a composition for a lithium alkali-aluminosilicate substrate is 61 mol % $SiO_2$, 18 mol % $Al_2O_3$, 10 mol % $Na_2O$, 5% mol $Li_2O$, 3 mol % $ZrO_2$, 1 mol % $K_2O$, 1 mol % CaO, and 1 mol % $B_2O_3$.

In a further embodiment, another suitable recipe/formulation for a lithium alkali-aluminosilicate substrate is 67.2 mol % $SiO_2$, 20.1 mol % $Al_2O_3$, 3.2% mol $Li_2O$, 2.7 mol % $TiO_2$, 1.7 mol % ZnO, 1.7 mol % $ZrO_2$, 1.1 mol % MgO, 0.9 mol % BaO, 0.4 mol % $Na_2O$, 0.23 mol % $K_2O$, and 0.05 mol % CaO.

In another exemplary embodiment, a recipe/formulation of soda-lime silicate glass is 70 mol % $SiO_2$, 13 mol % $Na_2O$, 10 mol % CaO, 4 mol % MgO, 2 mol % $Al_2O_3$, and 1 mol % $K_2O$.

In a further embodiment, a recipe/formulation of a clear soda-lime silicate glass is 72.0-73.0 mol % $SiO_2$, 13.0-13.5 mol % $Na_2O$, 8.6-8.9 mol % CaO, 4.1-4.3 mol % MgO, 0.5-0.7 mol % $Al_2O_3$, 0.2-0.4 mol % $K_2O$, and 0.07-0.13 $Fe_2O_3$.

In a further exemplary embodiment, a recipe/formulation of a low-iron ultra-clear soda-lime silicate glass is 72.3 mol % $SiO_2$, 13.3 mol % $Na_2O$, 8.8 mol % CaO, 4.3 mol % MgO, 0.5 mol % $Al_2O_3$, 0.4 mol % $K_2O$, and <0.02 $Fe_2O_3$.

The above described embodiments are merely illustrative of typical and/or conventional formulations used in producing alkali-aluminosilicate glass, e.g., sodium and lithium alkali-aluminosilicate glass, soda-lime silicate glass and low-iron ultra-clear soda-lime silicate glass. As such, the same formulations are in no way considered limitative of the inventive concepts herein disclosed.

A glass sheet once selected may be subjected to one or more of the fabrication steps. Such fabrication steps may include cutting-to-size, perforating, edge treatment, hot bending and/or thermal annealing or strengthening or tempering, and/or surface treatment. Cutting and the optional addition of perforations may be accomplished using any of a number of processes such as laser cutting including that of filamentation or direct ablation, water-jet cutting, score/break, and abrasive grinding. Edge treatment may include etching and/or abrasive grinding, with or without an arris, on at least part of an edge. Hot bending may include heating the glass above its softening point, forming by a tool or mold with or without the assistance of a press or vacuum, so as to impart a permanent change to the shape of a glass sheet after cooling. Following hot bending or instead in a flat state, a thermal annealing or strengthening or tempering step may be undertaken which includes heating a glass sheet to a temperature sufficient to allow the glass network to reorganize followed by controlled or rapid cooling respectively to relieve or capture compressive and tensile stress in the glass network. Surface treatment may include abrasive polishing and/or etching at least part of a surface.

The preferred method of fabrication to cut a glass sheet to size, and if required add perforations including holes or notches, may be by filamentation using an ultra short pulse Picosecond or Femtosecond laser. The filamentation process may use directed energy pulses from such a laser to insert a row of filaments along a desired cut path. Such filaments may be 1-2 microns in diameter, perpendicular to the glass surface, penetrate through the majority of the glass thickness, and may be spaced between 1 and 12 microns apart but preferably 5 microns. Filaments may be laid down in the thickness as levels in cases where the glass is thicker. The row of filaments may be subject to mechanical tensile stress in order to snap and cleave the cut. An alternate method, especially useful for perforations or shape cuts, may be the application of localized heating along the filaments, such as by $CO_2$ laser, to generate thermal tensile stress to cleave the cut. The edge which results after cleaving may be absent chipping, have a finish resembling that of a flat grind, but may remain moderately sharp at its extremities.

It is preferred the edge yielded from cleaving a row of filaments along a desired cut path is subject to additional edge treatment to minimize micro cracks which may be especially prevalent along edge extremities. Such an edge treatment may include grinding in a "C-shape" along the bulk edge with an abrasive wheel or belt. However more preferable is to submit the edge to a flat plane abrasive grind to create micro arris features that bisect the angles created by intersecting planes along the edge, thereby blunting sharp extremities. Such intersecting planes may be formed by an edge and a major surface, an edge and another edge, or an edge and another edge and a major surface. Such a micro arris may have a profile which is preferably a flat plane or may have a profile whereby the flat plane exhibits a slight roundness. Such a micro arris may have a surface roughness equivalent to that yielded by an abrasive medium of smoother than 200 grit and preferably equal to 600 grit. The micro arris measured across its diagonal face may have a dimension less than 0.01 mm, between 0.01 mm and less than 0.025 mm, between 0.025 mm and less than 0.05 mm, between 0.05 mm and less than 0.1 mm, between 0.1 mm and less than 0.2 mm, between 0.2 mm and less than 0.3 mm, between 0.3 mm and less than 0.5 mm, between 0.5 mm and 1.0 mm, or greater than 1.0 mm.

The preferred process for edge treatment which may impart a micro arris between edge and major surface including at the corner points is to construct a first specialized abrasive grinding machine. Such a machine consists of two adjacent abrasive belts or discs rotated by motors. Such a machine also includes a support surface which may consist of a conveyor, air flotation, or wheels. With regard to the design of such a machine, the abrasive planes of the two belts or discs may be oriented between 45 and 135 degrees to each other in an open scissor arrangement, but preferably at 90 degrees. The table on the machine may be oriented in a plane generally bisecting the angle between the two abrasive planes. The face of the abrasive belts or discs may be silicon carbide and may have an abrasion value smoother than 200 grit and preferably equal to 600 grit. A glass sheet may be placed onto the table of the specialized machine and oriented so one major surface of the glass sheet sits on top of the table and the glass edge being treated is parallel with the abrasive planes.

The preferred process for edge treatment continues and the glass sheet may be pushed into the abrasive planes, and then moved sideways with a force and speed sufficient to blunt the extremity where edge and face intersect. Such a step may impart one or more micro arris features each having a face which approximately bisects the angle between edge and major surface. A preferred sub step is to withdraw the glass edge after the corner point and then rotate the glass sheet. Such a rotation may be optimally half the angle created by the intersecting planes of edge and edge at the corner point. The edge of the glass sheet may then be pushed back in to engage the abrasive planes with a force sufficient to blunt the extremity where edge and surface and edge intersect. Such a step may impart one or more micro arris features each having a face which approximately bisects the angles between edge and edge and major surface and which thus may resemble a facet in appearance.

The preferred process for edge treatment which may impart a micro arris between edge and edge at the corners is to construct a second specialized abrasive grinding machine. Such a machine consists of one abrasive belt or disc rotated by a motor. Such a machine also includes a support surface which may consist of a conveyor, air flotation, or wheels. With regard to the design of such a machine, the abrasive plane of the belt or disc may be oriented between 0 and 90 degrees to the prior direction of sideways travel, but preferably at 45 degrees. The table on the machine may be oriented in a plane generally perpendicular to the abrasive plane. The face of the abrasive belts or discs may be silicon carbide and may have an abrasion value smoother than 200 grit and preferably equal to 600 grit. A glass sheet may be placed onto the table of the specialized machine and oriented so one major surface of the glass sheet sits on top of the table and the glass corner being treated is bisected by the abrasive plane.

The preferred process for edge treatment continues and the glass sheet may be pushed into the abrasive plane with a force sufficient to blunt the extremity where edge and edge intersect. Such a step may impart a micro arris feature having a face which approximately bisects the angle between edge and edge. Edge treatment continues with the perforations whereby the extremities of notches and cutouts may be abraded in the same manner already outlined. Internal cutouts or slots may be abraded on the extremities and corner points using a small rotating abrasive tool which allows manipulation inside small openings. Holes may be abraded at extremities of the rim by use of a chamfered drill bit which is in the shape of a section of a cone. Such a small rotating abrasive tool or a chamfered drill bit may have an abrasion value smoother than 200 grit and preferably equal to 600 grit. Holes and other perforations are generally exposed to high levels of mechanical force so it is preferable on such features to conduct an etching step in addition to abrasive grinding so as to reduce the likelihood of the presence of microscopic flaws in such strength critical regions.

Regardless as to whether abrasive edge grinding is conducted, edge treatment may or may not include exposing at least part of an edge for a period of time to an acid or alkaline etching medium, for example one containing a concentration of hydrofluoric acid or sodium hydroxide. One or more etching steps are preferably mild and sufficient only to smooth the tips on microscopic flaws while yielding no measurable change to edge dimensions or aesthetic. However one or more etching steps may be adjusted in intensity and location so as to also etch away the extremities along an edge and/or yield a frosted edge finish. Etching medium may be applied to a glass edge or part thereof, by means of a roller sponge or brush followed by a period of time where the etching reaction occurs followed by a washing step to remove the etching medium and prevent the etching reaction from proceeding further.

The cutting and edge treatment process as disclosed is preferable because it is cost efficient, micro arris features are aesthetically pleasing and functional, micro cracks are minimized, and a high level of dimensional accuracy is achievable. The process steps as disclosed apply to a laser cutting process by filamentation but are contemplated to be equally applicable to a laser cutting process by ablation. While it is preferred the disclosed cutting and edge treatment process is conducted prior to strengthening by ion-exchange, it is possible one or more steps may be undertaken after ion-exchange, or indeed after reverse ion-exchange. The disclosed cutting and edge treatment process allows for dimensional tolerances to be determined almost exclusively by the accuracy through which a row of filaments along a desired cut may be inserted into the glass by laser. Indeed after cleaving along a row of filaments, the objective is to avoid any further change to the dimensional properties of the glass sheet when measured between two points each located along the bulk of an edge (the central region of an edge away from its extremities). The disclosed edge treatment confines dimensional alterations to only those regions of an edge at the extremities of intersecting planes. Indeed with such a methodology it is possible to obtain perimeter and perforation sizing in the glass exhibiting a tolerance of +/−0.2 mm, +/−0.1 mm, or indeed better than +/−0.05 mm.

Other fabrication steps may or may not be undertaken with the disclosed cutting and edge treatment process. Hot bending, as well as thermal annealing or strengthening or tempering, are generally undertaken only before chemical-strengthening since reorganization of the glass network inevitably results in a majority decline, if not outright loss, to surface compressive stress induced by ion-exchange. While not limiting, a preferred embodiment of this disclosure is to not conduct thermal strengthening or tempering following hot bending. A preferred embodiment for this disclosure is to conduct hot bending and followed by a step of thermal annealing only when such is necessary to obtain a glass sheet with a greater predetermined profile of curvature such as a tight radius or complex geometric shape. While not limiting, a preferred embodiment of this disclosure is to not conduct a flat state thermal annealing or strengthening or tempering step.

While not limiting, a preferred embodiment of this disclosure is to also not conduct a fabrication step of surface treatment which may include abrasive polishing and/or etching at least part of a surface. Such a step of surface treatment may include the abrasive polishing of one or more metallic tin contaminated surface regions which has already been discussed as expensive and prone to the introduction of flaws. Such surface treatment may or may not include exposing at least part of a surface for a period of time to an acid or alkaline etching medium, for example one containing a concentration of hydrofluoric acid or sodium hydroxide. Such an etching step may be mild sufficient only to smooth tips on microscopic flaws while yielding no measurable change to dimensions or aesthetic, a medium etch which may also impart an anti-glare property on a surface, or a strong etch which may also impart a frosting to a surface.

Additional to any variations which may have been introduced by some of the possible aforementioned steps of glass sheet fabrication, substrate glasses also have variations within their opposing surface regions which affect the propensity for ions to ion-exchange during chemical-strengthening. A variation may exist between opposing surface regions due to differences in the amount of tin contamination leftover from production of the glass substrate by the float process which acts as a "blocker." A glass substrate produced by the float process will have a higher amount of tin metal in one major surface region as compared to its opposing major surface region. Absent further manipulation to the physical characteristics of the glass or purposeful variation of the ion-exchange parameters on opposing surface regions during chemical-strengthening, the major surface of the glass sheet which contains the greater quantity of metallic tin ions is the "treatment-disadvantaged" surface region as compared to the opposing major surface which is the "treatment-advantaged" surface region.

A variation may also exist between opposing surface regions due to differences in the annealing histories residually present from production of the glass substrate by the fusion process which forms a more tightly connected glass network structure. Absent further manipulation to the physical characteristics of the glass or purposeful variation of the ion-exchange parameters on opposing surface regions during chemical-strengthening, the result of such variation in the annealing histories is that one major surface of a glass sheet is more easily treated by chemical-strengthening and may be termed the "treatment-advantaged" surface region. Conversely, the opposing major surface of a glass sheet is less easily treated by chemical-strengthening and thus conversely may be termed the "treatment-disadvantaged" surface region.

The orientation of the treatment-advantaged as compared to the treatment-disadvantaged surface region as already mentioned can vary from just those physical characteristics imparted by the basic method of production. Such variation may be the result of additional fabrication processes. For example, a ceramic-frit coating may be fired onto a glass surface region before chemical-strengthening by ion-exchange. Such firing occurs at a high-temperature to fuse the ceramic-frit coating to the glass network so it becomes part of the glass substrate. An example of such a coating is a ceramic-frit vacuum insulating glass sealant or a ceramic-frit decorative colored paint. While most ceramic-frit coatings block later ion-exchange, ceramic-frit coatings, or indeed other coatings, may be in development which contain a concentration of alkali-ions of an equivalent species to the host alkali ions already present in the glass substrate. Once fused to the glass substrate, these alkali-ions in the ceramic-frit behave in a similar manner to the host alkali-ions present in the glass substrate and are capable of strengthening ion-exchange. However, such coatings typically applied to a single side while still allowing for chemical-strengthening add yet another variation between opposing surface regions.

Such variation may be the result of other means described in the art which also have as their goal a reduced curvature or attainment of a predetermined profile of curvature. For example, if a metallic barrier film is added onto the non-tin surface of a float produced glass sheet then such a surface may become treatment-disadvantaged relative to the opposing tin-side which is generally uncovered by a metallic barrier film. In another example, a tin-float produced glass may be subjected to a process of de-alkalization on the non-tin side to reduce, relative to the opposing tin side, the quantity of host alkali ions available in the surface region for substitution with larger invasive ions during chemical-strengthening by ion-exchange. De-alkalization may remove, or at least decrease, the quantity of host alkali-ions, primarily in the outer 5 microns and possibly through the application of sulfur dioxide ($SO_2$) gas onto the non-tin glass surface region.

Another variation which has shown promise for countering warpage and which has been the subject of large research investments is the application of fluorine ions predominantly on the non-tin surface of float glass. Such fluorine ions are applied during the forming stage of the float process by exposing the glass at very high temperatures to a fluid containing fluorine, typically hydrofluoric gas. A hybrid of the de-alkalization and the barrier film concepts, fluorine ions are a halogen not an alkali. Since implantation of fluorine ions in the glass substrate occurs prior to chemically-strengthening the glass sheet by ion-exchange, the premise that fluorine ions cause relaxation to compressive stresses in a glass surface region may be more accurately restated as the presence of fluorine ions in a glass surface region inhibit the building of strengthening compressive stresses during ion-exchange.

While not limiting, a preferred embodiment of this disclosure is for the glass substrate to contain substantially no fluorine ions. Indeed when a glass sheet is purposefully treated with fluorine ions before chemical-strengthening, predominantly on its non-tin surface, the lesser fluorinated tin side containing larger quantities of metallic tin may be stated to have a propensity upon chemical-strengthening by ion-exchange to become the "treatment-advantaged" tin side, at least as compared to more fluorinated "treatment-disadvantaged" non-tin side. Thus, such fluorinated glass substrates may with at least a shorter period of otherwise equivalent ion-exchange exhibit an instinctively opposite curvature, with the lesser fluorinated tin surface side having greater volume and warping toward the more fluorinated non-tin surface which has a relatively lesser volume. However the quantity of fluorine ions purposefully introduced before chemical-strengthening by ion-exchange may be tailored in concentration and depth so that with longer periods of otherwise equivalent ion-exchange then a more typical curvature emerges with the lesser fluorinated tin surface falling gradually behind the more fluorinated non-tin surface.

Unlike a process of reverse ion-exchange which uses alkali-ions smaller than the invasive ions to relax already induced surface compressive stresses in a depth up to about 5 μm after chemical-strengthening by ion-exchange, a process of fluorination uses halogen ions to inhibit the development of surface compressive stresses during chemical-strengthening by ion-exchange optimally present in the surface up to a 30 μm to 40 μm depth. In shorter periods of chemical-strengthening, the behavior of fluorine ions is in many ways similar to that of metallic tin ions. However, the fluorine ions are an inefficient blocker to the penetration of invasive alkali ions toward deeper depths in the glass surface region. Thus with longer periods of ion-exchange, invasive alkali ions increasingly penetrate in greater quantities to deeper depths on the fluorinated non-tin side as compared to the less fluorinated tin side which contains the greater quantity of blocking tin. This enhanced penetration progressively counters the "treatment-disadvantage" resulting from the presence of the fluorine ions. As a result the "treatment-disadvantage" of the fluorinated non-tin side gradually wanes through a so called "equivalency" point, a theoretical zero curvature, beyond which the less fluorinated tin side again becomes the "treatment-disadvantaged" surface region.

Thus it is contemplated if the glass substrate contains fluorine, reverse ion-exchange as disclosed herein is a valid means with which to counter curvature exhibited prior to, or perhaps more importantly beyond, the equivalency point. Indeed, experience says such an equivalency point is a challenging technical target to achieve, at least on pieces with any size, where such a methodology must simultaneously strike a balance between variances in surface region tin content, surface region fluorine content, and invasive ion-exchange (all while staying within a specification level and depth of compressive stress). Thus, reverse ion-exchange may be used after a shorter period of strengthening ion-exchange on a glass substrate containing fluorine as a means to "walk the curvature forward" by relaxing compression in the lesser fluorinated tin surface relative to the more fluorinated non-tin surface. Alternately, reverse ion-exchange may be used after a longer period of strengthening ion-exchange on a glass substrate containing fluorine as a means to "walk the curvature backward" by relaxing compression in the more fluorinated non-tin surface relative to the lesser fluorinated tin surface.

One surface region being treatment-advantaged relative to the other surface region being treatment-disadvantaged results from all of the physical characteristics of the glass sheet and the specific parameters of chemical-strengthening by ion-exchange undertaken. By default such physical characteristics result from the basic method of sheet production, float versus fusion, the presence of a greater tin blocking layer and/or a differential annealing history on one surface region versus the other. These are discussed throughout the disclosure. While the side of the glass sheet containing a larger quantity of metallic tin is typically the "treatment-disadvantaged" surface of float produced thin chemically-strengthened glass, the possible introduction of one or more other factors requires the definition of treatment-advantaged and treatment-disadvantaged be broader. Such factors may include adding physical characteristics to the glass sheet before chemical-strengthening such as for example barrier coatings, ion-implantation, fluorination, de-alkalization, etc; Such factors may also or instead include specific parameters of chemical-strengthening by ion-exchange applied differently to opposing surface regions such as for example those of time, temperature, the addition of poisoning additives to the ion-exchange medium, and/or changes to the areal-density of the ion-exchange medium.

The terms "treatment-advantaged" and "treatment-disadvantaged" as used in this disclosure may be defined in a broad sense to refer to the comparative asymmetry between opposing surface regions in the substitution of larger invasive alkali ions in place of smaller host alkali ions before, during, and after chemical-strengthening by ion-exchange. Before chemical-strengthening by ion-exchange, the terms refer to a potential for relative asymmetry between opposing surfaces which has not yet occurred. During chemical-strengthening by ion-exchange, the terms refer to the asymmetry so far revealed between opposing surfaces which has at least up to that point in time so far occurred. After chemical-strengthening by ion-exchange, the terms refer to the actual asymmetry between opposing surfaces which has actually resulted in the glass sheet. Such a definition encompasses the possible introduction of factors which may change the asymmetry between opposing surface regions before, during, and most importantly that are resulting after chemical-strengthening by ion-exchange. Regardless as to comparative differences between opposing surfaces in the quantity and depth to which the substitution of larger invasive alkali ions in place of smaller host alkali ions, such comparative asymmetry manifests in the physical shape of the glass sheet. The treatment-advantaged surface region has a comparatively larger volume and thereby curves toward the comparatively smaller volume of the treatment-disadvantaged surface region.

For the purpose of introducing a predetermined profile of curvature, the thin glass substrate may additionally be heated above the softening temperature of the glass and be hot bent to the shape of a mold or tool to impart an initial profile of curvature. Despite a purposeful thermal annealing step after bending, contact of the thin glass substrate with the forming tool as well as the effect of geometry on cooling rates, concave versus convex, may impart thermally bent thin glass substrates with yet another new differential annealing history. Such a differential annealing history following hot bending may occur regardless as to whether basic method of production was by the float or fusion method. In fusion produced sheets, the result of such variation is that following bending one surface region is more easily treated by chemical-strengthening and may be termed "treatment-advantaged". Conversely, the opposing surface region is less easily treated by chemical-strengthening and thus conversely may be termed "treatment-disadvantaged". In float produced sheets, variation due to the annealing history from thermal bending is of a magnitude less than that which is imparted by differential tin concentrations. However variation in annealing history due to thermal bending may lessen or enhance the degree to which the non-tin surface region is "treatment-advantaged" and the opposing tin surface region is "treatment-disadvantaged".

Exemplary Ion-Exchange Mediums

As used herein an ion-exchange medium means a solid, liquid, or gas used for chemical-strengthening which contains invasive alkali metal ions. Invasive alkali ions are defined as those alkali metal ions having an average ionic radius that is larger than an average ionic radius of host alkali metal ions in the substrate glass before ion-exchange. Ion-exchange mediums may include one or more different species of invasive alkali ions. The preferred invasive alkali ion for strengthening glass surface regions containing host sodium alkali ions is potassium because it has an average ionic radius larger than the average ionic radius of sodium. Alternately, the preferred invasive alkali ions for strengthening glass surface regions containing host lithium alkali ions is sodium or potassium because both have an average ionic radius larger than the average ionic radius of lithium. However other alkali ions on the periodic table such as rubidium or caesium which are still larger in ionic radius may be included as invasive ions within the ion-exchange medium.

Such an ion-exchange medium may be presented to a glass sheet using any one, or combination thereof, of non-limiting methodologies. The generally accepted method for presenting an ion-exchange medium to the glass may be in the form of a molten liquid salt at high-temperature and contained within a tank within which the glass may be submerged for a period of time to conduct ion-exchange. While such submersion normally equates to holding the glass sheet below the liquid level line of the molten salt, another variation may be to maintain a liquid level line below that of the glass and use a high-temperature recirculation pump to dispense molten salt above which near continuously flows over the glass.

Another method of presenting an ion-exchange medium to the glass may be in the form of a solid paste applied to the glass followed optionally by a cooling and/or drying step followed by a period of time in a furnace to conduct ion-exchange. Still another method of presenting an ion-exchange medium to the glass may be in the form of a gaseous chemical vapor or plasma deposition applied to the glass followed optionally by a cooling and/or drying step followed by a period of time in a furnace to conduct ion-exchange. Finally another method for presenting an ion-exchange medium to the glass may be in the form of a liquid, which may be one of a molten salt mixture or solution or emulsion, or an aqueous salt solution, and applied by curtain coating, drizzle coating, dip coating, roll coating, slot coating, and/or spray coating followed optionally by a cooling and/or drying step followed by a period of time in a furnace to conduct ion-exchange.

The method for presenting an ion-exchange medium to the glass by curtain coating, drizzle coating, dip coating, roll coating, slot coating, and/or spray coating now disclosed may include applying a liquid exchange medium with the following characteristics. The liquid ion-exchange medium may be presented to the glass as a molten salt mixture or solution or emulsion. Such a molten salt mixture or solution or emulsion may contain at least one or more alkali salt compounds which may or may not be in a eutectic state of association. Such a molten salt mixture or solution or emulsion may have a temperature at or above its melting point. The liquid ion-exchange medium may instead be presented to the glass as an aqueous salt solution containing water. The aqueous salt solution may contain at least one or more alkali salt compounds which may or may not be fully dissolved within the water. The aqueous salt solution may have a temperature at or below its boiling point. The liquid ion-exchange medium, as with all of the ion-exchange mediums, may contain other components including one or more additives such as for example a clay, a solvent, a salt containing alkali ions equivalent to or smaller than the host alkali ions in the glass, a metal ion, or an alkaline earth ion.

Furthermore, such a liquid ion-exchange medium may be presented to the glass by one or more methods including curtain coating, drizzle coating, dip coating, roll coating, slot coating, and/or spray coating. Such presentation may take place while exposed to the atmosphere or within an enclosure which may also contain air or an inert atmosphere which may include nitrogen and/or argon. The liquid ion-exchange medium, whether a molten salt mixture or solution or emulsion, or an aqueous salt solution, may be subject to a means of agitation prior to its presentation to the glass. The liquid ion-exchange medium, whether a molten salt mixture or solution or emulsion, or an aqueous salt solution, may be applied by curtain coating, drizzle coating, dip coating, roll coating, slot coating, and/or spray coating to the entire glass sheet, at least one major surface (for example only on the tin side), at least one edge, at least part of a major surface, or at least part of an edge.

With regard to a liquid ion-exchange medium which is in the form of a molten salt mixture or solution or emulsion, there may at the time of presentation to the glass be one or more combinations for a temperature of the glass sheet, a temperature of the liquid molten salt, and a known temperature at which the liquid molten salt solidifies. The glass sheet may have a temperature less than 400° C., between 400° C. and less than 450° C., between 450° C. and 500° C., or greater than 500° C. The molten salt mixture or solution or emulsion may be a liquid with a temperature less than 400° C., between 400° C. and less than 450° C., between 450° C. and 500° C., or greater than 500° C. Furthermore there may be a known temperature at which the liquid molten salt solidifies. That is the molten salt mixture or solution or emulsion upon cooling may have a solidification temperature at which its phase changes from liquid to solid. The solidification temperature may be less than 400° C., between 400° C. and less than 450° C., between 450° C. and 500° C., or greater than 500° C. The molten salt mixture or solution or emulsion may or may not have a liquid temperature and/or a solidification temperature resulting from a eutectic association of salt compounds in a binary or ternary or quaternary system.

With regard to a liquid ion-exchange medium in the form of an aqueous salt solution, there may at the time of presentation to the glass be one or more combinations for a temperature of the glass sheet, a temperature of the aqueous salt solution, and a concentration of one or more ionic alkali salts as a percentage of a saturation point within the aqueous salt solution. The glass sheet may have a temperature less than 60° C., between 60° C. and less than 80° C., between 80° C. and less than 100° C., between 100° C. and the boiling point of the aqueous salt solution, between greater than the boiling point of the aqueous salt solution and 140° C., or greater than 140° C. The aqueous salt solution may have a temperature less than 60° C., between 60° C. and less than 80° C., between 80° C. and less than 100° C., or between 100° C. and the boiling point of the aqueous salt solution. The concentration may be expressed as the total mass of ionic alkali salts within the aqueous salt solution as a percentage of the total mass of ionic alkali salts in an equivalent ratio within the aqueous solution at the saturation point which may be less than 20%, 20% to less than 40%, 40% to less than 60%, 60% to less than 80%, greater than 80% up to 100%, or greater than 100% with or without super-saturation and with or without precipitation formation.

With regard to a liquid ion-exchange medium which is in the form of an aqueous salt solution, there may at the time of presentation to the glass be a specific mass ratio between the constituent components. The mass of water ($H_2O$) contained within the aqueous solution as a percentage of the total mass of the aqueous solution may be less than 20%, 20% to less than 40%, 40% to less than 60%, 60% to less than 80%, or greater than 80%. The mass of all ionic alkali salt compounds contained within the aqueous solution as a percentage of the mass of the total aqueous solution may be less than 20%, 20% to less than 40%, 40% to less than 60%, 60% to less than 80%, or greater than 80%. The mass of at least a first ionic alkali salt compound as a percentage of the total mass of all ionic alkali salt compounds contained within the aqueous salt solution may be 100%, from 100% to greater than 90%, from 90% to greater than 80%, from 80% to greater than 60%, from 60% to greater than 40%, from 40% to greater than 20%, or 20% or less. Any difference between the mass of a first ionic alkali salt compound and the total mass of all ionic alkali salt compounds contained within the aqueous salt solution may be composed of a second ionic alkali salt compound different to the first ionic alkali salt compound, or instead may be composed of more than one other ionic alkali salt compound different to one another and the first ionic alkali salt compound.

Following presentation of the liquid ion-exchange medium to the glass, the subsequent exchange medium coated glass may be submitted to an optional cooling step. Such cooling may be to a temperature at or below a solidification temperature. Such cooling may allow the liquid-exchange medium to change to a more preferable solid or semi-solid state. Possible methods of cooling include so called free cooling, forced cooling with fans, forced cooling with the assistance of refrigerated gases, or controlled cooling with the assistance of irradiative, conductive or convective heat. Such cooling may take place while the glass sheet is openly exposed to the atmosphere or within an enclosure which contains air or an inert atmosphere which may include nitrogen and/or argon. A cooled ion-exchange medium may or may not contain more than one alkali ionic salt which may or may not be in a eutectic state of association. Following optional cooling, the temperature of the glass substrate may be less than 40° C., between 40° C. and less than 60° C., between 60° C. and less than 80° C., between 80° C. and less than 100° C., between 100° C. and less than 120° C., between 120° C. and less than 140° C., between 140° C. and 250° C., or greater than 250° C.

Regardless of whether the cooling step is undertaken, the exchange medium coated glass may be submitted to an optional drying step. Such drying may allow the liquid-exchange medium to change to a more solid or semi-solid state. Possible methods of drying include exposure to irradiative, conductive and/or convective heat-transfer. Such drying may take place while the glass sheet is openly exposed to the atmosphere or within an enclosure such as a drying oven containing dry air or an inert atmosphere which may include nitrogen and/or argon. Such a drying step may include a period of time at a temperature less than 60° C., between 60° C. and less than 80° C., between 80° C. and less than 100° C., between 100° C. and less than 120° C., between 120° C. and less than 140° C., between 140° C. and 250° C., or greater than 250° C. The period of time may be less than 5 minutes, more than 5 minutes to less than 15 minutes, 15 minutes to less than 30 minutes, 30 minutes to less than 1 hour, 1 hour to less than 2 hours, 2 hours to 6 hours, or more than 6 hours. The drying step may include more than one temperature and more than one period of time. The dried ion-exchange medium may or may not contain more than one ionic alkali salt in a eutectic state of association. Regardless as to whether the optional cooling and/or drying steps are undertaken, the glass coated in ion-exchange medium is then submitted to a means for conducting ion-exchange at high-temperature for a period of time.

Where possible it is important to minimize changes to ion-exchange parameters which affect the amount of curvature revealed following chemical-strengthening by ion-exchange. One source of dynamism is the traditional operation of a molten salt tank within which a buildup of host ion effluent occurs as such ions are repeatedly exchanged out of glass sheets into the salt. All parameters being equal, increasing host ion effluent concentrations within the molten salt progressively alter with the amount of curvature revealed in the thin glass sheets chemically-strengthened by ion-exchange. Thus it is preferred to use an ion-exchange medium which offers consistency in its contamination by host ion effluent. A preferred embodiment is to use the salt tank process variation of using a molten salt filled to a liquid line beneath the glass sheet along with a recirculation pump so as to make the quantity of effluent contaminated salt less costly to replace. Another preferred embodiment is to use only new ion-exchange medium previously uncontaminated by host ion effluent as part of the methods of solid salt paste, gaseous chemical vapor or plasma deposition, or the application of a liquid exchange medium in the form of a molten salt mixture or solution or emulsion, or an aqueous salt solution, applied to the glass by curtain coating, drizzle coating, dip coating, roll coating, slot coating, and/or spray coating.

An exemplary embodiment for a liquid ion-exchange medium is potassium nitrate ($KNO_3$) contained within a salt bath, or enclosure containing molten salt, within which the glass substrate is submerged and subject to the application of heat definable by a thermal profile of time at temperature. The liquid ion-exchange medium contained within a salt bath simultaneously contacts all surfaces of the glass substrate including its edges. In this non-limiting example, invasive alkali ions of potassium migrate from the potassium nitrate liquid medium into the surfaces of the glass substrate and host alkali ions such as sodium migrate out of the surfaces of the glass substrate into the liquid medium. Such a liquid ion-exchange medium is an exemplary embodiment for strengthening an alkali containing glass substrate by ion-exchange.

Another exemplary embodiment for a solid ion-exchange medium is a salt paste containing potassium nitrate and a rheological agent such as kaolin clay which may be applied to all surfaces of the glass substrate including its edges followed by the application of heat definable by a thermal profile of time at temperature. Ion-exchange mediums are typically also applied to the perimeter edges as well as the edges of any perforations so as to chemically-strengthen all outer surfaces of the glass substrate. However, the application or non-application of an ion-exchange medium to the edges of the glass substrate is no way considered limitative of the inventive concepts herein disclosed. In this non-limiting example, invasive alkali ions of potassium migrate from the potassium nitrate solid paste medium into the surfaces of the glass substrate and host alkali ions such as sodium migrate out of the surfaces of the glass substrate into the solid paste medium. Such a solid ion-exchange medium is an exemplary embodiment for strengthening an alkali containing glass substrate by ion-exchange.

Gas ion-exchange mediums are also contemplated in addition to liquid and solid ion-exchange mediums. For example, methods are known in the art where a salt compound such as potassium chloride (KCl) is deposited onto the glass surfaces by gas vapor deposition and subject to the application of heat definable by a thermal profile of time at temperature. Such a method may use a hot aerosol generator to create a potassium chloride vapor which contacts all surfaces of the glass substrate including its edges. In this non-limiting example, invasive alkali ions of potassium migrate from the potassium chloride vapor into the surfaces of the glass substrate and host alkali ions such as sodium migrate out of the surfaces of the glass substrate into the vapor medium. Such a gas ion-exchange medium is an exemplary embodiment for strengthening an alkali containing glass substrate by ion-exchange The configuration of the ion-exchange medium may be modified in density with greater or lesser concentration of one or more species of invasive alkali ions. It is noted the concentration of invasive alkali metal ions can be varied by adjusting which alkali metal salt compound, or combination thereof, is used. If more than one salt is used, such salts may or may not be in a eutectic state of association. Examples of salt compounds are alkali metal nitrates, sulfates, halides, phosphates, carbonates, and chlorides, which contain invasive alkali metal ions in different densities. Some of the more common examples of alkali salt compounds which may be used during ion-exchange are potassium nitrate ($KNO_3$), potassium sulfate ($K_2SO_4$), potassium bromide (KBr), potassium iodide (KI), monopotassium phosphate ($KH_2PO_4$), dipotassium phosphate ($K_2HPO_4$), tripotassium phosphate ($K_3PO_4$), potassium carbonate ($K_2CO_3$), potassium chloride (KCl), rubidium chloride (RbCl) and rubidium nitrate ($RbNO_3$).

For instance, potassium nitrate ($KNO_3$) has a molar mass of 101.10 g/mol of which the single potassium ion represents 38.7% of its molar mass. The density of potassium nitrate at 20° C. is 2.11 g/cm$^3$ and thus the concentration of potassium ions is 0.817 g/cm$^3$ at the said temperature. In contrast, potassium chloride (KCl) has a molar mass of 74.55 g/mol of which the single potassium ion represents 52.4% of the mass. The density of potassium chloride at 20° C. is 1.98 g/cm$^3$, and thus the concentration of potassium ions by mass is 1.038 g/cm$^3$ at said temperature. While density changes with temperature, an ion-exchange medium of potassium nitrate salt may be said to contain a different concentration of invasive potassium alkali metal ions than is contained within an ion-exchange medium of potassium chloride of an equal volume at identical temperature.

The concentration of invasive alkali metal ions in the ion-exchange medium, and their availability for inter-diffusion, may also be varied by the inclusion of other additives in the ion-exchange medium that may also impart specific properties. The ion-exchange medium may include additives of clay such as for example kaolin, water, or solvents such as for example glycerol or diethylene glycol, which may reduce the concentration of invasive alkali-metal ions. The ion-exchange medium may include a percentage of alkali ions which are of an average ionic radius equivalent to, or smaller than, the host alkali ions in the glass substrate before ion-exchange (i.e., so called "mixed salt baths" known in the art). For example the ion-exchange medium may include sodium ions where such a species is not actually the invasive alkali ion such as when sodium and potassium are both constituents of the ion-exchange medium applied to a sodium alkali-aluminosilicate glass. The ion-exchange medium may include a percentage of metal ions for adding color or germ resistance; such as for example copper ions or silver ions respectively. Finally, the ion-exchange medium may include a percentage of low mobility alkaline earth ions such as magnesium (Mg) ions, calcium (Ca) ions, strontium (Sr) ions or barium (Ba) ions.

Exemplary Ion-Exchanged Glass

Ion-exchanged glass means any alkali-containing substrate which has been chemically-strengthened by ion-exchange processing. As used herein, ion-exchange processing is defined as the chemical inducement of compressive stress to strengthen the surface region of a glass substrate by exposure to an ion-exchange medium in the presence of heat definable by a thermal profile of time at temperature. During ion-exchange, host alkali metal ions in a glass substrate vacate from the glass surface region and the larger invasive alkali metal ions present in the ion-exchange medium wedge into the voids causing the volume of the glass surface regions to expand. Provided the temperature is below the annealing temperature of the glass substrate at which the glass network structure can relax, a shallow but high-level of compressive stress is formed in the glass surface region. This compressive stress increases surface region hardness to resist the formation of scratches, and forces closed microscopic flaws at or near the surface thereby reducing the likelihood of crack propagation on impact or load and thus greatly enhancing glass strength.

The ion-exchange rate for a given glass substrate is the net quantity of larger invasive alkali ions substituted in place of smaller host alkali ions in the glass substrate over a period of time and is a function of temperature, the ion-exchange medium, and the chemical structure of the glass substrate. The period of time for conducting ion-exchange may range from as little as a few minutes to as long as 24 hours or greater depending upon the level and depth of compressive stresses and thus strengthening required. The temperature for conducting ion-exchange may be varied but is preferably above 400° C., though typically not to exceed the safe stability of the ion-exchange medium or the annealing temperature of the glass substrate where the glass network structure can relax to accommodate the increased volume of invading alkali ions in the surface region and as a result the compressive stress is lost. It is noted that applied voltage assistance, or frequency directed heating, both known in the art may also be used to increase the rate of ion-exchange. While the composition of the ion-exchange medium can be varied, it is required to include alkali metal ions having an average ionic radius larger than the host alkali metal ions in the glass substrate before ion-exchange and in a concentration suitably high so as to induce net ion-exchange in the surface regions of the glass substrate (i.e., the building of compressive stresses).

An exemplary embodiment of ion-exchanged glass is a sodium aluminosilicate glass which has been chemically-strengthened by ion-exchange through submersion for a period of 4 hours in a salt bath containing 100% liquid potassium nitrate at a temperature of 435° C. The resulting chemically-strengthened glass exhibits a compressive stress greatest at the surface and follows a gradient of decline through the diffusion depth of the invasive alkali metal ions terminating at the depth of compressive layer (DOL), the location of zero compressive stress beyond which tensile stresses occur. In such an exemplary embodiment the surface compressive stress is at least 600 MPa and the depth of compressive layer (DOL) is at least 40 µm. Another exemplary embodiment of chemically-strengthened glass is a soda-lime silicate glass which has been chemically-strengthened by ion-exchange through submersion for a period of 4 hours in a salt bath containing 100% liquid potassium nitrate at a temperature of 435° C. The resulting chemically-strengthened glass exhibits a compressive stress greatest at the surface and follows a gradient of decline through the diffusion depth of the invasive alkali metal ions terminating at the depth of compressive layer (DOL). In such an exemplary embodiment the surface compressive stress is at least 300 MPa and the depth of compressive layer (DOL) is at least 15 µm.

Strengthening by ion-exchange is preferably to greater levels and depths of surface compressive stress. The level of surface compressive stress in both surface regions of the glass substrate after ion-exchange is preferably at least 100 MPa, preferably at least 200 MPa, preferably at least 300 MPa, preferably at least 400 MPa, preferably at least 500 MPa, preferably at least 600 MPa, preferably 700 MPa or greater, preferably 800 MPa or greater, preferably 900 MPa or greater, and preferably 1,000 MPa or greater. Greater levels of surface compressive stress result in greater strength since tensile stresses from impact or loading must exceed the surface compressive stress at the tip of a flaw for a crack to propagate and result in breakage. The depth of the compressive stress in both surface regions of the glass substrate after ion-exchange is preferably at least 10 µm, preferably at least 15 µm, preferably at least 20 µm, preferably at least 30 µm, preferably at least 40 µm, preferably 50 µm or greater, preferably 60 µm or greater, preferably 75 µm or greater, and preferably 100 µm or greater. Greater depths of compressive stress provide added resistance to the relief of surface compression by abrasions or scratches which if deep enough may enter the tensile region and result in breakage.

However care must be taken to monitor corresponding tensile forces, the central tension, within the remaining central region of the glass sheet. Central tension is the tensile stress which is an equal and opposing force to the compressed surface regions. An increase in the level of central tension beyond a level of that which is preferable for glass of a particular recipe may result in excessive frangibility. In other words, the glass sheet may become excessively fragile especially when the glass sheet is one of exemplary thinness and the distance between the opposing compressed surface regions is small. The level of central tension in a glass sheet is preferably less than 70 MPa, preferably less than 60 MPa, more preferably less than 50 MPa, and most preferably less than 40 MPa. Higher levels of central tension provide stored energy to propagate fracturing if tensile stresses exceed compressive stresses at the tip of a flaw.

Thus a glass sheet of a particular recipe and a particular thickness may be said to have a preferred combination of level of surface compressive stress, depth of the surface compressive stress, and level of central tension. For example, an alkali-aluminosilicate glass formulation with a thickness of 0.55 mm may have such a preferred combination at a level of surface compressive stress in both surface regions which is at least 600 MPa, a depth of the compressive stress in both surface regions which is at least 40 µm, and a level of central tension which is less than 40 MPa. A more preferable combination for such a formulation and thickness is a level of surface compressive stress in both surface regions which is 700 MPa or greater, a depth of the compressive stress in both surface regions which is 50 µm or greater, and a level of central tension which is less than 50

MPa. Such combinations are non-limiting and may be adjusted on one or more surface regions, or parts thereof, so as to achieve the optimum combination of strength, longevity, and frangibility for a particular glass thickness and formulation as well as to meet the requirements of a particular glass application.

The ion-exchange rate differs between the treatment-advantaged and treatment-disadvantaged surface regions of the glass substrate. Such a characterization refers to the speed with which alkali ion diffusion occurs under equivalent conditions of chemical-strengthening by ion-exchange and at a minimum is affected by the physical characteristics in the glass substrate imparted by the basic method of production, fusion verses float. Indeed when exposed to identical parameters of chemical-strengthening, the treatment-advantaged surface region in sum gains greater compressive stresses than the treatment-disadvantaged surface region. The treatment-advantaged surface region, when compared to the treatment-disadvantaged surface region, may exhibit one or more of a higher level of compressive stress at the surface, greater depth of compressive layer (DOL), or greater compressive stress within the diffusion gradient between the surface and zero point depth of compressive layer where compressive stresses terminate. As such a surface region may be defined to mean the outermost face of a glass substrate continuing inward through the diffusion gradient for invasive alkali ions to the depth of compressed layer.

Furthermore, the ion-exchange step may be purposefully modified to impart a greater or lesser curvature exceeding that which otherwise results due to the physical characteristics imparted to the glass by the basic method of production, fusion verses float. This may be accomplished by conducting ion-exchange which differs between one surface region or part thereof and the opposing surface region or part thereof in at least one of barrier film, temperature, period of time, or configuration of ion-exchange medium including in at least one of the volume of the ion-exchange medium, the species of invasive alkali ions contained therein, the concentration of a species of invasive alkali ions contained therein, and the inclusion of additives therein which modify the rate of ion-exchange, etc. Differing ion-exchange between one surface region or part thereof, and the opposing surface region or part thereof, may be selectively used to induce a differential expansion of surface region volumes to induce greater or lesser curvature.

Furthermore it is contemplated greater or less curvature may be purposefully introduced into a glass sheet as a step in obtaining a predetermined profile of curvature. For example surface compressive stress may be enhanced along a specific dimensional axis in one or more areas of the surface region. For example, a second step of ion-exchange with an ion-exchange medium again containing invasive alkali ions, for example larger rubidium ions, may be selectively applied to all or part of a glass surface region in a geometric pattern such as dots or lines with alternating spaces there between absent of ion-exchange medium to induce localized directional compression.

Additionally, the ion-exchanged chemically-strengthened glass may be produced with greater compressive stress than otherwise is required by the glass application so as to generate a "reservoir" of compressive stress for further modification during a step of reverse ion-exchange as further outlined in the disclosed inventive methods. Alternately, for the purpose of deliberately inducing a more radical profile of curvature into a chemically-strengthened glass substrate, as previously mentioned it is possible the glass substrate may have been heated above the softening temperature of the glass and thermally bent to the shape of a mold or tool to impart an initial profile of curvature before ion-exchange. However such a step may inevitably impart a differential annealing history to the curved glass substrate which causes the profile of curvature to change during ion-exchange that is in addition to any asymmetry between surface regions which may result from differential tin contamination of the opposing surface regions in a float produced substrate.

Regardless as to what steps are taken to purposefully impart a greater or lesser curvature during ion-exchange step, the expansion of the treatment-advantaged verses treatment-disadvantaged surface regions occurs by differing amounts. Physical characteristics present in the substrate before ion-exchange, namely tin contamination or differential annealing histories, induce asymmetrical volume expansion in the treatment-advantaged and treatment-disadvantaged surface region during the step of ion-exchange. Indeed typically beneficial properties imparted by ion-exchange such as high levels of compressive stress and deep diffusion depths may magnify the differential uptake of ions between surface regions and thus induce greater curvature in sheets where flatness, that is reduced or zero curvature is desired. A differential expansion of surface region volumes and thus an undesired change to the curvature of the substrate occurs during ion-exchange regardless as to what additional methods are employed to lessen or enhance curvature to a predetermined level during ion-exchange, if any.

Regardless of the cause of such differential uptake of salt ions during ion-exchange, the expanded surface regions pivot about a central region of tension and the resulting dimensional differences are accommodated by deformation to the shape of the thin chemically-strengthened glass substrate. Such deformation occurs additional to any curvature exhibited by the thin glass substrate prior to ion-exchange, be that a profile of curvature imparted by an optional step of thermal bending before ion-exchange or small deviations from flatness resulting from the tolerances of primary production by the float or fusion process. For example, an otherwise flat thin glass substrate deforms during chemical-strengthening by ion-exchange into a curved body deviating from that of a true flat plane. Indeed on float produced glass substrates, the chemically-strengthened glass substrate may deform so much as to resemble a shallow dish following ion-exchange. Even a chemically-strengthened glass substrates previously shaped by a thermal bending step reveals additional change to the profile of curvature after ion-exchange. As previously stated curvature is the difference in distance on the z-axis exceeding that of glass thickness between higher and lower points on the substrate from an imaginary flat plane bisecting the thickness centerline. Profile of curvature is an accumulation of such points in space to define the dimensional shape of a curved body.

Exemplary Reverse Ion-Exchange Mediums

As used herein a reverse ion-exchange medium means a solid, liquid, or gas used for reverse ion-exchange which includes reversing alkali ions. Reversing alkali ions are defined as those alkali metal ions having an average ionic radius that is equal to, or smaller than, the average ionic radius of host alkali metal ions in the substrate glass before ion-exchange. Reverse ion-exchange mediums may include one or more species of reversing alkali ion. The preferred reversing alkali ion for relaxing a glass surface region containing sodium host alkali ions before ion-exchange is sodium because it has an average ionic radius equal to the average ionic radius of the host alkali ions of sodium in the glass surface region before ion-exchange. However the reversing alkali ion for relaxing a glass surface region containing sodium host alkali ions before ion-exchange may also be lithium because it has an average ionic radius smaller than the average ionic radius of the sodium host alkali ions in the glass surface region before ion-exchange. Alternately, the preferred reversing alkali ions for relaxing a glass surface region containing lithium host alkali ions before ion-exchange is lithium because it has an average ionic radius equal to the average ionic radius of the lithium host alkali ions in the glass surface region before ion-exchange.

Such a reverse ion-exchange medium may be presented to a glass sheet using any one, or combination thereof, of non-limiting methodologies as previously presented for strengthening ion-exchange. One method of presenting a reverse ion-exchange medium to the glass may be in the form of a molten liquid salt at high-temperature and contained within a tank within which the glass may be submerged for a period of time to conduct reverse ion-exchange. While such submersion normally equates to holding the glass sheet below the liquid level line of the molten salt, another variation may be to maintain a liquid level line below that of the glass and use a high-temperature recirculation pump to dispense molten salt above which near continuously flows over the glass.

Another method of presenting a reverse ion-exchange medium to the glass may be in the form of a solid paste applied to the glass followed optionally by a cooling and/or drying step followed by a period of time in a furnace to conduct reverse ion-exchange. Still another method of presenting a reverse ion-exchange medium to the glass may be in the form of a gaseous chemical vapor or plasma deposition applied to the glass followed optionally by a cooling and/or drying step followed by a period of time in a furnace to conduct reverse ion-exchange. Finally another method for presenting a reverse ion-exchange medium to the glass may be in the form of a liquid, which may be one of a molten salt mixture or solution or emulsion, or an aqueous salt solution, and applied by curtain coating, drizzle coating, dip coating, roll coating, slot coating, and/or spray coating followed optionally by a cooling and/or drying step followed by a period of time in a furnace to conduct reverse ion-exchange.

During presentation of a reverse ion-exchange medium to a glass sheet, it is an important feature of the methodology that control may be exercised over which surface regions of the glass the reverse ion-exchange medium is presented. By exerting such control, specific surface regions may or may not, depending on if the reverse ion-exchange medium is presented, be subject to relaxing reverse ion-exchange on exposure to a suitable temperature for a period of time in order to conduct reverse ion-exchange. Indeed such methods for exercising surface region specific control may be equally applicable to the methodologies presented earlier in the disclosure for chemical-strengthening by ion-exchange. Regardless, the preferred method is to mask off that portion of the glass where application of the reverse ion-exchange medium is undesirable so as to prevent reverse ion-exchange from occurring in those specific regions after transfer into a high-temperature furnace for a period of time. A less preferable method is to wash away the reverse ion-exchange medium with water from specific regions before conducting reverse ion-exchange.

A mask may be composed of a temporary physical barrier. For example a preferred method is to create a mask composed of a high-temperature gasket or adhesive tape or film which is applied to glass surface areas where coverage by the reverse ion-exchange medium is undesirable. Indeed such a mask may take the form of a silkscreen through which the reverse ion-exchange medium is applied. It is contemplated a mask may be used to apply a reverse ion-exchange medium along a specific dimensional axis in one or more areas of the surface region of a glass sheet. It is contemplated a reverse ion-exchange medium may be selectively applied using a mask to all or part of a glass surface region in a geometric pattern such as dots or lines with alternating spaces absent of reverse ion-exchange medium to induce localized directional relaxation.

Another method of masking is to use vacuum suction to draw two opposing identically-sized glass sheets together along a perimeter gasket of high-temperature silicone which may be of a T-shape so as to seal the edge regions as well as a major face of each opposing glass sheet from application of the reverse ion-exchange medium during presentation. Still another method of masking is the use of a silicone rubber sheet which contains internal surface channels through which a vacuum is drawn thereby bonding the rubber sheet to a specific glass surface region and creating a mask during presentation of the reverse ion-exchange medium. Such masks which act as a temporary physical barrier may be removed after application of the reverse ion-exchange medium to the desired glass surface regions. Alternately, masks may be of a design and construction to remain in place following transfer of the reverse ion-exchange medium coated glass into a high-temperature furnace for a period of time to conduct reverse ion-exchange.

Another preferable method of masking is a chemical mask. For example, the application of a temporary coating to a specific surface region of the glass so an aqueous salt solution presented to the glass simply runs off without adhering or the remnants of which are easily wiped away thereafter. An example of such a coating is RAIN-X® produced by ITW Global Brands, a division of Illinois Tool Works (ITW) of Glenview, Ill. This synthetic hydrophobic coating may be surface applied to the glass by wiping or spraying. Such a coating causes water to bead on the glass surface and if such beading occurs prior to water removal from an aqueous salt solution then coating of the glass by the reverse ion-exchange medium may be limited in that particular surface area of the glass. Furthermore, such a coating is organic and thus may simply burn away during the period of time which follows in a furnace to conduct reverse ion-exchange An exemplary embodiment for a liquid reverse ion-exchange medium is an aqueous salt solution containing a one-to-one (w/w) mixture of sodium nitrate ($NaNO_3$) and sodium carbonate ($Na_2CO_3$) which are fully dissolved in hot water. Such a liquid reverse ion-exchange medium is an exemplary embodiment for relaxing by reverse ion-exchange a treatment-advantaged surface region of an alkali containing glass substrate. A glass substrate is masked off using tape around the perimeter edge region so as to avoid exposure of the more vulnerable areas previously subjected to cutting and edge treatment to the reverse ion-exchange medium. The glass sheet is then pre-heated and the aqueous liquid salt is presented by spray-coating onto the treatment-advantaged surface region. Following a cooling step and a drying step, the tape mask is removed from around the perimeter edge region. The resulting glass substrate is coated by a eutectic mixture of the two salt compounds each containing reversing alkali ions which are presented across the full treatment-advantaged surface region except for the excluded vulnerable perimeter area.

Another exemplary embodiment for a solid reverse ion-exchange medium is a salt paste containing sodium nitrate and a rheological agent such as kaolin clay which may be applied to the treatment-advantaged surface region of the glass substrate then dried. The glass substrate is then subject to the application of heat definable by a thermal profile of time at temperature. Such a solid reverse ion-exchange medium is an exemplary embodiment for relaxing a treatment-advantaged surface region of chemically-strengthened glass substrate by reverse ion-exchange. Gaseous and plasma reverse ion-exchange mediums are also contemplated in addition to liquid and solid reverse ion-exchange mediums.

The configuration of the reverse ion-exchange medium may be modified in density with greater or lesser concentrations of one or more species of reversing alkali ions presented to the surface region. It is noted the concentration of reverse alkali metal ions can be varied by adjusting which alkali metal salt compound, or combination thereof, is used. If more than one salt is used, such salts may or may not be in a eutectic state of association. Examples of salt compounds are alkali metal nitrates, sulfates, halides, phosphates, carbonates, and chlorides, which contain reverse alkali metal ions in different densities. Some of the more common examples of alkali salt compounds which may be used during reverse ion-exchange are sodium nitrate ($NaNO_3$), sodium sulfate ($Na_2SO_4$), sodium bromide (NaBr), sodium iodide (NaI), monosodium phosphate ($NaH_2PO_4$), disodium phosphate ($Na_2HPO_4$), trisodium phosphate ($Na_3PO_4$), sodium carbonate ($Na_2CO_3$), sodium chloride (NaCl), lithium chloride (LiCl) and lithium nitrate ($LiNO_3$).

For instance, sodium nitrate ($NaNO_3$) has a molar mass of 84.99 g/mol of which the single sodium ion represents 27.0% of its molar mass. The density of sodium nitrate at 20° C. is 2.26 g/cm$^3$ and thus the concentration of sodium ions is 0.610 g/cm$^3$ at the said temperature. In contrast, sodium carbonate ($Na_2CO_3$) has a molar mass of 105.988 g/mol, of which the two sodium ions represents 43.4% of the mass. The density of sodium carbonate at 20° C. is 2.54 g/cm$^3$ and thus the concentration of sodium ions by mass is 1.102 g/cm$^3$ at said temperature. While density changes with temperature, a reverse ion-exchange medium of sodium nitrate salt may be said to contain a different concentration of reversing sodium alkali metal ions than is contained within a reverse ion-exchange medium of sodium carbonate of an equal volume at identical temperature.

The concentration of reverse alkali metal ions in the reverse ion-exchange medium, and their availability for inter-diffusion, may also be varied by the inclusion of other additives that may also impart specific properties. The reverse ion-exchange medium may include additives of clay such as for example kaolin, water, or solvents such as for example glycerol or diethylene glycol, which may reduce the concentration of reverse alkali-metal ions. It is contemplated, though certainly not required, that the reverse ion-exchange medium may include a percentage of alkali ions which are larger in average ionic radius larger than the host-alkali ions in the glass substrate before ion-exchange. For example the reverse ion-exchange medium may include a percentage of potassium ions to slow the reverse ion-exchange process. It is contemplated the reverse ion-exchange medium may include a percentage of metal ions for adding color or germ resistance, such as for example copper ions or silver ions respectively. The reverse ion-exchange medium may include a percentage of low mobility alkaline earth ions such as magnesium (Mg) ions, calcium (Ca) ions, strontium (Sr) ions, or barium (Ba) ions.

Exemplary Reverse Ion-Exchange Processing

Figure 4A:
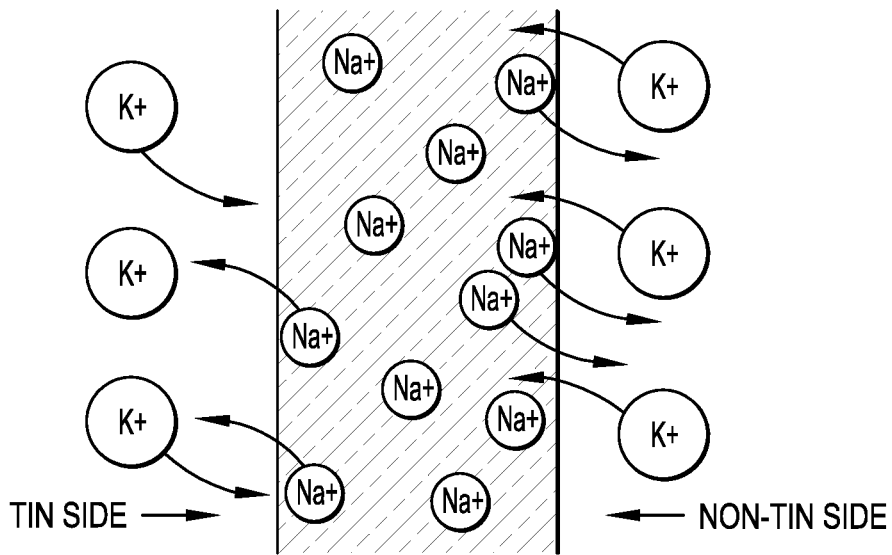
FIG. 4A depicts a cross-section of a glass sheet prepared by a tin float process, and illustrates conventional chemical-strengthening of the glass sheet by ion-exchange.
Figure 4B:
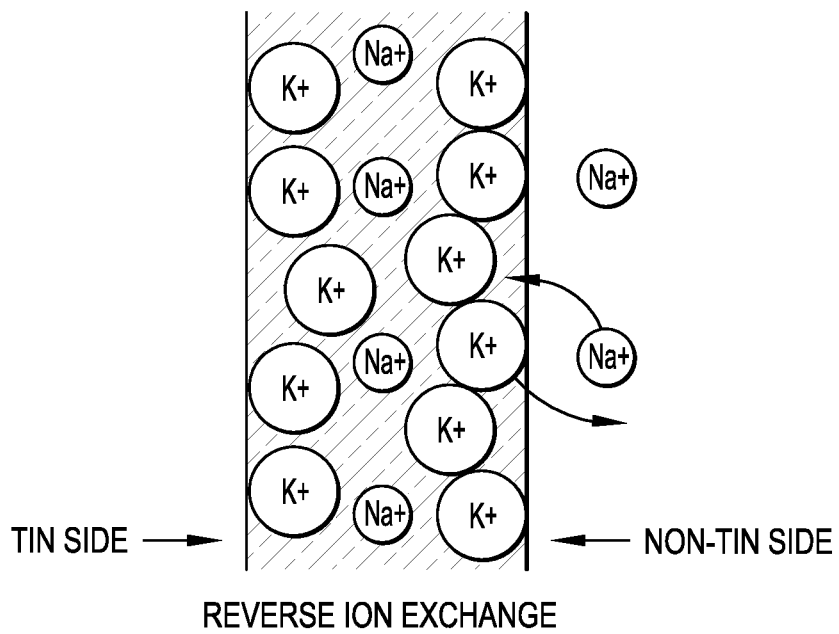
FIG. 4B depicts a cross-section of a chemically-strengthened glass sheet prepared by a tin float process, and illustrates reverse ion-exchange applied to the non-tin side, the treatment-advantaged surface region, of the chemically-strengthened glass sheet.

FIG. 4A and FIG. 4B are sketches relevant to the processing steps as they are utilized and described herein As used herein, reverse ion-exchange processing is defined as the chemical induced relaxation of compressive stress within the chemically-strengthened surface region of a glass substrate by exposure to a reverse ion-exchange medium in the presence of heat definable by a thermal profile of time at temperature. During reverse ion-exchange processing, larger alkali metal ions in the glass substrate vacate from the glass surface region and smaller alkali metal ions in the reverse ion-exchange medium move into the voids causing the volume of the glass surface region to slightly contract. Provided the temperature is above that at which reverse ion-exchange can occur, a slight relaxation can be induced to compressive stresses in a surface region from the surface to preferably less than 15 μm in depth, preferably less than 10 μm in depth, and most preferably less than 5 μm in depth. Indeed, it is preferred the level of the surface compressive stress in a reverse ion-exchanged surface region declines by no more than 10%, more preferably by no more than 7.5%, and most preferably by no more than 5.0% during reverse ion-exchange.

It is preferred when conducting reverse ion-exchange that the temperature remains lower and the period of time shorter so as to minimize any relaxation to the glass network structure and/or the redistribution of larger invasive alkali ions across the breadth of the diffusion depth in the surface regions. Specifically, at higher temperatures and/or longer periods of time the level of compressive stress may decline throughout the diffusion depth of the surface region as the larger invasive alkali metal ions diffuse further into the depth and their concentration gradient flattens across a greater diffusivity volume. An example of such time at temperature is that which occurs during annealing of thin glass substrates at temperatures above 400° C. for multiple hours, for example a thermal profile of 400° C. to 500° C. for 6 to 8 hours. By contrast for the purpose of attaining reduced or zero curvature or a predetermined profile of curvature, it is preferred the temperature remains lower and the period of time shorter so as to induce a controlled relaxation of compressive stress from the surface to more preferably no greater than about 10 μm in depth and most preferably to no greater than about 5 μm in depth. In this way changes to the level and depth of compressive stress across the breadth of the surface regions due to relaxation of the glass network or ion redistribution which would further alter asymmetry are avoided (i.e., so the amount of stress relaxation required remains static not a "moving target").

The reverse ion-exchange rate for a given glass substrate is the net quantity of smaller ions substituted in place of larger ions in the chemically-strengthened glass substrate over a period of time and is a function of temperature, the reverse ion-exchange medium, and the chemical structure of the glass substrate. The period of time for conducting reverse ion-exchange is preferably less than 30 minutes, more preferably less than 20 minutes, more preferably less than 10 minutes, and most preferably less than 5 minutes, depending upon the decrease of compressive stresses and thus the level of strength relaxation required. The temperature for conducting reverse ion-exchange may be varied but is preferably less than 400° C., more preferably less than 380° C., more preferably less than 360° C., and most preferably less than 340° C. For the purpose of achieving a reduced or zero curvature or a predetermined profile of curvature in the inventive methods and articles provided, it is preferred the thermal profile for reverse ion-exchange is a specific combination of time at temperature suitable to avoid measurable changes to the level and depth of compressive stress across the entire compressed surface regions as a whole (i.e., it is preferred the compressed surface regions ancillary to the shallow depth of reverse ion-exchange remain unaffected). It is contemplated applied voltage assistance, or frequency directed heating, both known in the art may also be used to locally enhance the rate of reverse ion-exchange and thereby allow further reductions to time and/or temperature.

An exemplary embodiment of a reverse ion-exchanged glass with a reduced or zero curvature is a sodium aluminosilicate glass wherein the treatment-advantaged surface region is relaxed by reverse ion-exchange. An aqueous salt solution containing one-to-one (w/w) mixture of sodium nitrate ($NaNO_3$) and sodium carbonate ($Na_2CO_3$) which are fully dissolved in hot water is presented by spray-coating onto the treatment-advantaged surface region of the pre-heated glass substrate. A cooling and drying step follows and the resulting glass substrate is coated by a eutectic mixture of the two salt compounds each containing reversing alkali ions which are presented across the full treatment-advantaged surface region except for an excluded vulnerable perimeter area. The glass substrate is then subject to reverse ion-exchange by the application of heat definable by a thermal profile of 4 minutes period of time at a 330° C. temperature. In such an exemplary embodiment, the resulting reverse ion-exchanged chemically-strengthened glass exhibits a slight relaxation in compressive stress in the treatment-advantaged surface region from the surface to about 5 µm in depth while the level of surface compressive stress after reverse ion-exchange remains at least 600 MPa and the depth of compressive layer remains at least 40 µm. The resulting chemically-strengthened substrate has less curvature than is present in the chemically-strengthened glass substrate prior to reverse ion-exchange Another exemplary embodiment of a reverse ion-exchanged glass with a reduced or zero curvature is a soda-lime silicate glass wherein the treatment-advantaged surface region is relaxed by reverse ion-exchange. A solid salt paste containing sodium nitrate ($NaNO_3$) and sodium carbonate ($Na_2CO_3$) and a rheological agent such as kaolin clay is applied to the treatment-advantaged surface region of the glass substrate then followed by a drying step. A salt paste containing only sodium nitrate and a greater concentration of kaolin clay is applied to the treatment-disadvantaged surface region of the glass substrate then followed by a drying step. In this exemplary example, the reverse ion-exchange mediums have different configurations of areal density with a greater concentration of reversing alkali ions presented to the treatment-advantaged surface region than the treatment-disadvantaged surface region. The glass substrate is then subject to reverse ion-exchange by the application of heat definable by a thermal profile of 4 minutes period of time at a 330° C. temperature. In such an exemplary embodiment, the resulting reverse ion-exchanged chemically-strengthened glass exhibits a slight relaxation in compressive stress in the treatment-disadvantaged surface region, and a comparatively greater relaxation in compressive stress in the treatment-advantaged surface region, from the respective surfaces to about 5 µm in depth while the level of surface compressive stress after reverse ion-exchange remains at least 300 MPa and the depth of compressive layer remains at least 15 µm. The resulting chemically-strengthened substrate has less curvature than is present in the chemically-strengthened glass substrate prior to reverse ion-exchange.

A further exemplary embodiment of a reverse ion-exchanged glass with a predetermined profile of curvature is a sodium aluminosilicate glass wherein conversely the treatment-disadvantaged surface region is relaxed by reverse ion-exchange. An aqueous salt solution containing a one-to-one (w/w) mixture of sodium nitrate ($NaNO_3$) and sodium carbonate ($Na_2CO_3$) which are fully dissolved in hot water is presented by spray-coating onto the treatment-advantaged surface region of the pre-heated glass substrate. The glass substrate is then subject to reverse ion-exchange with the application of heat definable by a thermal profile of a 6 minute period of time at a 314° C. temperature. In such an exemplary embodiment, the resulting reverse ion-exchanged chemically-strengthened glass exhibits a slight relaxation in compressive stress in the treatment-disadvantaged surface region from the surface to about 5 µm in depth while the level of surface compressive stress after reverse ion-exchange remains at least 600 MPa and the depth of compressive layer remains at least 40 µm. The resulting chemically-strengthened substrate has more curvature than is present in the chemically-strengthened glass substrate prior to reverse ion-exchange. The resulting chemically-strengthened substrate has a predetermined profile of curvature which was not present in the chemically-strengthened glass substrate prior to reverse ion-exchange.

A further exemplary embodiment of a reverse ion-exchanged glass with a predetermined profile of curvature is a sodium aluminosilicate glass which is heated to its softening point and is thermally bent to the shape of a mold followed by chemical-strengthening wherein thereafter the treatment-advantaged surface region is relaxed by reverse ion-exchange. An aqueous salt solution containing a one-to-one (w/w) mixture of sodium nitrate ($NaNO_3$) and sodium carbonate ($Na_2CO_3$) which are fully dissolved in hot water is presented by spray-coating onto the treatment-advantaged surface region of the pre-heated glass substrate. Cooling and drying steps follow and the glass substrate is then subject to reverse ion-exchange with the application of heat definable by a thermal profile of a 4 minute period of time at a 330° C. temperature. In such an exemplary embodiment, the resulting reverse ion-exchanged chemically-strengthened glass exhibits a slight relaxation in compressive stress in the treatment-advantaged surface region from the surface to about 5 µm in depth while the level of surface compressive stress after reverse ion-exchange remains at least 600 MPa and the depth of compressive layer remains at least 40 µm. The resulting chemically-strengthened substrate has less curvature than is present in the chemically-strengthened glass substrate prior to reverse ion-exchange. The resulting chemically-strengthened substrate has a predetermined profile of curvature which is not present in the chemically-strengthened glass substrate prior to reverse ion-exchange.

The relaxation of compressive stress in at least one surface region by reverse ion-exchange is preferably accomplished without significant reduction to the level and depth of surface compressive stress achieved during previous strengthening ion-exchange. The level of surface compressive stress in both surface regions of the glass substrate after reverse ion-exchange is preferably at least 100 MPa, preferably at least 200 MPa, preferably at least 300 MPa, preferably at least 400 MPa, preferably at least 500 MPa, preferably at least 600 MPa, preferably 700 MPa or greater, preferably 800 MPa or greater, preferably 900 MPa or greater, and preferably 1,000 MPa or greater. Reduction to the level of surface compressive stress results in lower strength since tensile stresses from impact or loading may exceed the surface compressive stresses at the tip of a flaw allowing a crack to propagate resulting in breakage. The depth of the compressive stress in both surface regions of the glass substrate after reverse ion-exchange is preferably at least 10 μm, preferably at least 15 μm, preferably at least 20 μm, preferably at least 30 μm, preferably at least 40 μm, preferably 50 μm or greater, preferably 60 μm or greater, preferably 75 μm or greater, and preferably 100 μm or greater. Reduction to the depth of compressive stress results in less resistance to the relief of surface compression by abrasions or scratches which if deep enough may enter the tensile region and result in breakage.

Most typically the reverse ion-exchange process begins with measurement of the curvature present in the thin glass substrate following completion of the step of ion-exchange. A procedure is typically followed where the amount of curvature exhibited by the ion-exchanged glass substrate regardless as to its origin is measured by instrument. Such instruments may include non-contact optical scanners or laser micrometers to quantitatively define the amount of curvature presented by an ion-exchanged glass substrate. Indeed with more sophisticated three dimensional optical surface scans, the amount of curvature out of plane (or that which is desired) may be quantified across localized regions on the glass substrate. For example, a three dimensional point scanning laser may be used to obtain "point-cloud data" which may be transferred to CAD software to build a representation of the dimensional properties of the thin glass substrate. Regardless of the means by which the measurements are conducted, a net quantity of curvature change can be deduced from that which is present in the thin glass substrate after ion-exchange and that which is desired.

The parameters of reverse ion-exchange may be adjusted relative to the amount of curvature present in the ion-exchanged glass substrate prior to reverse ion-exchange to result in a condition of reduced or zero curvature, or a predetermined profile of curvature, after reverse ion-exchange. From the quantitative definition of the dimensional properties of one, all, or a sampling of thin glass substrates after ion-exchange, a prediction may be made based on the curvature already exhibited by the ion-exchanged glass substrates and the parameters for the reverse ion-exchange process may be adjusted as necessary in order to produce a more accurate prediction for achieving reduced or zero curvature or a predetermined profile of curvature. However it is important to note the modification of curvature including that which has resulted from the asymmetrical expansion of surface volumes is also one of a practical problem in a production environment rather than one which may always be solved by instrumentation measurements and predictive formulas. As such, reverse ion-exchange as a process offers a flexible means with many parameters through which adjustments may be made quickly on the shop floor to achieve a net change to the differential sum of compressive stresses between opposing surface regions in order to produce a chemically-strengthened thin glass substrate which contains reduced or zero curvature or a predetermined profile of curvature There are several parameters by which adjustment may be made to the modification of the curvature of the thin glass substrate during the reverse ion-exchange so as to attain reduced or zero curvature or alternately a predetermined profile of curvature. These are optionally selected by criteria for effectiveness, simplicity, and cost efficiency and may include variation to at least one of time, temperature, and configuration of the reverse ion-exchange medium. Production efficiency warrants that reverse ion-exchange is preferably undertaken over a single thermal profile with a single configuration of reverse ion-exchange medium usually applied to the typically the treatment-advantaged surface region. However it is possible to conduct reverse ion-exchange with parameters that include more than one thermal profile of time at temperature and/or with more than one configuration of reverse ion-exchange medium. For example, the step of reverse ion-exchange may be repeated one or more times with the same or different parameters if the modification of curvature was found to be unsatisfactory during a previous attempt. The primary limiting factor to reverse ion-exchange is if the level of compressive stress in a reverse ion-exchanged surface is lessened beneath the minimum requirements for the glass application. However, even in such a rare occurrence the substrate ostensibly could again be re-strengthened by ion-exchange, and of course again be subject to reverse ion-exchange (to achieve reduced or zero curvature or a predetermined curvature).

Alteration to the time at temperature is one means of variation for adjusting the modification of the curvature of the thin glass substrate during reverse ion-exchange. For example, the application of heat definable by a thermal profile of time at temperature may be adjusted to include a shorter or longer period of time at greater or lesser temperatures. Conducting reverse ion-exchange at a lower temperature requires a longer time period with a given reverse ion-exchange medium to achieve greater stress relaxation but affords more effectiveness in controlling the level of such relaxation. Again it is generally preferred when conducting reverse ion-exchange that the temperature remain lower and the period of time shorter so as to minimize any relaxation to the glass network structure and/or the redistribution of ions in the diffusion depth beneath the shallow surface region which is being subjected to a step of reverse ion-exchange as well as avoiding substantial change to the entire diffusion depth of any surface region which is not subject to reverse ion-exchange. Indeed, it is preferred to avoid any meaningful change (i.e., change greater than the resolution accuracy of the measuring instrument) to the level and depth of compressive stress in a surface region not directly subject to reverse ion-exchange.

Alteration to the configuration of the reverse ion-exchange medium is another means of variation for adjusting the modification of the curvature of the thin glass substrate during reverse ion-exchange. This is the preferred means in a production environment, be it one of a continuous mechanized line or a batch process, by which to conduct small ongoing adjustments to the modification of the curvature of the thin glass substrate during the reverse ion-exchange so as to attain reduced or zero curvature or alternately a predetermined profile of curvature. Indeed production is preferably arranged to conduct reverse ion-exchange at a set time at temperature and as a result ongoing minor modifications may be made to the reverse ion-exchange step by varying the reverse ion-exchange medium so as to counter smaller differences between the treatment-advantaged and treatment-disadvantaged surface regions between individual thin glass substrates. Indeed, it is possible to adjust the modification of curvature by variation to at least one of volume of the reverse ion-exchange medium, the species of reversing alkali ions contained therein, the concentration of a species of reversing alkali ions contained therein, and the inclusion of additives therein which modify the rate of reverse ion-exchange.

Firstly, the volume of the reverse ion-exchange medium may be varied to a greater or lesser volume to present a larger or smaller quantity of reversing alkali ions to a glass surface region during reverse ion-exchange. A thinner application of reverse ion-exchange medium applied to the glass surface region will more quickly at a given time at temperature become saturated by larger alkali metal ions diffusing out of the glass surface region during reverse ion-exchange and thus more quickly lose its effectiveness for relaxation. A thicker application of reverse ion-exchange medium applied to the glass surface region may contain enough reversing alkali metal ions that variations resulting from lower effectiveness due to the larger alkali metal ions diffusing out of the glass surface region during reverse ion-exchange remain for the most part undetectable. As a result, changes to the volume (thickness verses thinness of application) of the reverse ion-exchange medium applied to a glass surface region may be used to vary the relaxation to the compressive stress during reverse ion-exchange and thereby provide adjustment to the modification of curvature in the thin glass substrate.

Secondly, the species of reversing alkali ions within the reverse ion-exchange medium may be varied to present reversing alkali ions of a different average ionic radius to a glass surface region during reverse ion-exchange. A reverse ion-exchange medium which contains a given concentration of lithium ions, as opposed to a reverse ion-exchange medium that contains a given concentration of sodium ions, applied to the glass surface region of a sodium alkali-aluminosilicate glass will more quickly at a given time at temperature reduce the surface volume of the glass surface region during reverse ion-exchange. Furthermore the reversing alkali ions may be a combination of two species of reversing alkali ions, such as for example a mixture of both lithium ions and sodium ions. As a result, changes to the species of reversing alkali ions contained within the reverse ion-exchange medium applied to a glass surface region may be used to vary the relaxation to the compressive stress during reverse ion-exchange and thereby provide adjustment to the modification of curvature in the thin glass substrate.

Thirdly, the concentration of the species of reversing alkali ions within the reverse ion-exchange medium may be varied to present greater or lesser quantities of reversing alkali ions to a glass surface region during reverse ion-exchange. It has previously been noted the concentration of reversing alkali metal ions can be varied in the reverse ion-exchange medium by adjusting which alkali metal salt compound, or combination thereof, is used in the reverse ion-exchange medium. Examples of salt compounds are alkali metal nitrates, sulfates, halides, phosphates, carbonates, and chlorides, which contain reverse alkali metal ions in different densities. For example, the density of sodium ions in a salt compound of sodium carbonate differs from the density of sodium ions in a salt compound of sodium nitrate. Thus a reverse ion-exchange medium which contains a greater concentration of sodium ions in a given volume (i.e., a greater density) when applied to the glass surface region will more quickly at a given time at temperature reduce the surface volume of the glass surface region during reverse ion-exchange. As a result, changes to the concentration of one or more species of reversing alkali ions contained within the reverse ion-exchange medium applied to a glass surface region may be used to vary the relaxation to the compressive stress during reverse ion-exchange and thereby provide adjustment to the modification of curvature in the thin glass substrate.

Finally, the inclusion of additives within the reverse ion-exchange medium may be varied to modify the rate of reverse ion-exchange of the reversing alkali ions presented to a glass surface region during reverse ion-exchange. The rate of reverse ion-exchange medium may be adjusted by the inclusion of additives of clay such as for example kaolin, water, or solvents such as for example glycerol or diethylene glycol, which reduce the concentration of reverse alkali-metal ions presented to the surface region in the reverse ion-exchange medium. Furthermore it is also contemplated the reverse ion-exchange medium may be modified in chemistry to include an additive such as an alkaline earth ion like calcium or invasive alkali ion such as potassium. For example the addition of a small percentage of alkaline earth ions such as calcium or invasive alkali ions such as potassium may be used to slow the reverse ion-exchange rate of reverse ion-exchange medium by reducing the net rate of reverse ion-exchange of larger ions out of the glass surface region. However the concentration of such additives needs to remain suitably low so as to avoid net ion-exchange (i.e., the building of compressive stress) or the preclusion of reverse ion-exchange (i.e., preventing the compressive stress relaxation). A preferred embodiment of this invention is to conduct reverse ion-exchange with a reverse ion-exchange medium which when applied contains no alkaline earth ions and no invasive alkali-ions.

Furthermore variation of parameters on one or more surface regions or partial areas thereof is another adjustment which may be made to the modification of the curvature of the thin glass substrate during the reverse ion-exchange so as to attain reduced or zero curvature or alternately a predetermined profile of curvature. For example, the application of heat defined by time and temperature may be specific to the entire glass substrate but also differently applied to specific areas, be those particular surface regions or areas within those surface regions. Another example is variation to the configuration of the reverse ion-exchange medium which may be differently applied to specific areas, be those particular surface regions or areas within those surface regions. As previously stated, the step of reverse ion-exchange may be repeated one or more times with the same or different parameters which may be extended to include specific areas, be those particular surface regions or areas within those surface regions. The steps of reverse ion-exchange may be conducted simultaneously, sequentially, and in another sequence or combination of sequences. As a result, variation of the parameters to include specific areas, be those particular surface regions or areas within those surface regions thereof, may be used to vary the relaxation to the compressive stress during reverse ion-exchange and thereby provide further adjustment to the modification of the curvature in localized areas of the surface regions by differing amounts.

There are preferred surface regions or partial areas thereof for the modification of the curvature of the thin glass substrate during reverse ion-exchange. Reverse ion-exchange may of course be conducted across a full major surface of the glass sheet. Reverse ion-exchange may be conducted on one or more glass edges, or part thereof, purposefully or as a result of contamination by the reverse ion-exchange medium. Reverse ion-exchange may be conducted on the opposing major surface, again purposefully or as a result of contamination by the reverse ion-exchange medium especially near perimeter edges and/or perforation edges. While the process for reverse ion-exchange as disclosed reduces the level of compressive stress by preferably only a minimum amount, the edges and the major surface regions which directly adjoin such edges are the most critical regions of a glass sheet for strength. Indeed it is these areas of the glass sheet which are most at propensity to be the origin of fractures resulting from external impact, mechanical force, or the from flaws introduced by fabrication such as cutting or edge treatment.

Thus a preferred embodiment of this invention is to conduct reverse ion-exchange across a full area of a major surface but exclusive of the edges as well as the vulnerable surface areas subject to cutting or the addition of perforations. While greater asymmetry of compressive stress thus remains in these excluded areas after reverse ion-exchange, the size of these excluded areas is suitably small so as not to unduly influence modification of the curvature in the glass sheet as a whole (i.e. the surface regions where cutting or perforating occur are of insufficient size to demonstrate visible curvature or affect the curvature exhibited in the glass sheet as a whole). An area of the major surface which is excluded during reverse ion-exchange step may include a band adjacent to the edges which has a width less than 0.1 mm, between 0.1 mm and less than 1.0 mm, between 1.0 mm and less than 3.0 mm, between 3.0 mm and less than 6.0 mm, between 6.0 mm and less than 12.0 mm, between 12.0 mm and 25.0 mm, or greater than 25.0 mm.

Thus a reverse ion-exchange medium is preferably applied to at least a surface region of the chemically-strengthened glass substrate. More preferably, a reverse ion-exchange medium is applied to at least one major surface region of the chemically-strengthened glass substrate. Still more preferably, a reverse ion-exchange medium is applied to at least the totality of one major surface region of the chemically-strengthened glass substrate. Even more preferably, a reverse ion-exchange medium is applied to at least one major surface region of the chemically-strengthened glass substrate excluding any area subject to dimensional changes such as cutting and/or the addition of perforations. Most preferably, a reverse ion-exchange medium is applied to at least the totality of one major surface region of the chemically-strengthened glass substrate excluding any area subject to dimensional changes such as cutting and/or the addition of perforations.

In a preferred embodiment of this disclosure, there is a method for making a chemically-strengthened thin glass substrate with reduced or zero curvature. A thin glass substrate with a chemical structure in its surface regions is provided. The glass chemical structure includes host alkali ions having an average ionic radius situated in the surface regions of the thin glass substrate. The glass substrate has a treatment-advantaged surface region and a treatment-disadvantaged surface region located opposing each other. The method includes providing an ion-exchange medium. The ion-exchange medium includes invasive alkali ions having an average ionic radius that is larger than the average ionic radius of the host alkali ions. The method includes applying the ion-exchange medium, preferably of an equal configuration to both glass surface regions as well as the edges. The method includes conducting ion-exchange, preferably with equal parameters such as time and temperature, while applying the ion-exchange medium, to produce a chemically-strengthened substrate. The method includes providing a reverse ion-exchange medium. The reverse ion-exchange medium includes reversing alkali ions having an average ionic radius that is equal to, or smaller than, the average ionic radius of host alkali ions before ion-exchange. The method includes applying the reverse ion-exchange medium to at least the treatment-advantaged surface region. The method also includes conducting reverse ion-exchange while applying the reverse ion-exchange medium to produce a chemically-strengthened substrate with a reduced curvature or zero curvature.

Further modifications to the step of reverse ion-exchange are possible in order to produce a chemically-strengthened thin glass substrate which contains reduced or zero curvature following the step of reverse ion-exchange. To obtain reduced or zero curvature, the preferred method is to conduct reverse ion-exchange principally on the treatment-advantaged surface region of the thin glass substrate. However, reverse ion-exchange may also be conducted on the treatment-disadvantaged surface to also relax some of its compressive stress, provided such relaxation of stress is less in sum than that which occurs on the treatment-advantaged surface so the curvature in the glass substrate previously chemically-strengthened by ion-exchange is reduced. The reverse ion-exchange of both surface regions may be conducted simultaneously, sequentially, and in other sequences. For example, if the compressive stress on the treatment-advantaged surface has been too greatly lessened, and the curvature has been reduced beyond a zero curvature and becomes negative, then reverse ion-exchange may be conducted on the treatment-disadvantaged surface region to induce curvature in the opposite direction and thereby remove a negative curvature condition. The reverse ion-exchange of the treatment-disadvantaged surface may be kept suitably less than that initially conducted on treatment-advantaged surface region by variation to at least one of time, temperature, and configuration of the reverse ion-exchange medium so as to attain a further reduced or zero curvature.

In another embodiment of this inventive disclosure, there is a method for making a chemically-strengthened thin glass substrate with a predetermined profile of curvature. A thin glass substrate with a chemical structure in its surface regions is provided. The glass chemical structure includes host alkali ions having an average ionic radius situated in the surface regions of the thin glass substrate. The glass substrate has a treatment-advantaged surface region and a treatment-disadvantaged surface region located opposing each other. The glass substrate may optionally be heated to its softening point then thermally bent to the shape of a tool or mold prior to ion-exchange. The method includes providing an ion-exchange medium. The ion-exchange medium includes invasive alkali ions having an average ionic radius that is larger than the average ionic radius of the host alkali ions. The method includes applying the ion-exchange medium, preferably of an equal configuration to both glass surface regions as well as the edges. The method includes conducting ion-exchange, preferably with equal parameters such as time and temperature while applying the ion-exchange medium, to produce a chemically-strengthened substrate. The method includes providing a reverse ion-exchange medium. The reverse ion-exchange medium includes reversing alkali ions having an average ionic radius that is equal to, or smaller than, the average ionic radius of host alkali ions before ion-exchange. The method includes applying the reverse ion-exchange medium to at least one surface region. The method also includes conducting reverse ion-exchange while applying the reverse ion-exchange medium to produce a chemically-strengthened substrate with a predetermined profile of curvature.

Additional modifications to the step of reverse ion-exchange are possible in order to produce a chemically-strengthened thin glass substrate which contains a predetermined profile of curvature following the step of reverse ion-exchange. For example the reverse ion-exchange medium may be applied conversely to the treatment-disadvantaged surface region and reverse ion-exchange conducted to mildly exaggerate the curvature present after ion-exchange. Furthermore it is contemplated a reverse ion-exchange medium may be applied to all or part of a glass surface region in a geometric pattern of coverage such as dots or lines with alternating spaces there between absent of reverse ion-exchange medium. Such an application may be used to induce a differential contraction of volumes and thus a mild modification of the curvature along a specific dimensional axis or in one area of the surface region more than another. Additionally, it is contemplated though less preferred that reverse ion-exchange may be conducted on one surface region, or part thereof, while simultaneously conducting strengthening ion-exchange on another surface region, or part thereof, which for example if conducted on the opposing surface region may be used to impart more curvature than only a step of reverse ion-exchange provides.

As previously discussed, the ion-exchange step may have been purposefully modified to impart a greater or lesser curvature exceeding that which otherwise would result due to the physical characteristics of the glass substrate including those imparted by the basic method of production, fusion verses float. Regardless as to the cause of curvature in the thin glass substrate following the ion-exchange process, a step of reverse ion-exchange may be used to "fine-tune" curvature to a predefined profile of curvature. For example, a spherical curvature profile imparted during the step of ion-exchange may be further flattened or tightened by a step of reverse ion-exchange so as to meet a proscribed tolerance for a predefined profile of curvature. For the purpose of deliberately lessening/enhancing a predetermined profile of curvature, the reverse ion-exchange may be conducted on one or more surface regions or of course may also be applied to just a localized area of the substrate. Furthermore, reverse ion-exchange may be simultaneously conducted on opposing surface regions, or parts thereof, all but with slightly altered parameters of at least one of time, temperature, and configuration of the reverse ion-exchange medium so as to induce slightly different amounts of stress relaxation in the opposing surface regions to afford a finer level of resolution to the "fine-tuning" of the curvature than may be possible with reverse ion-exchange to only a single surface region.

Furthermore modifications to the step of reverse ion-exchange are possible in order to produce a chemically-strengthened thin glass substrate which exhibits an even more radical predetermined profile of curvature following the step of reverse ion-exchange. A thin glass substrate may be subject to a step of thermal bending prior to ion-exchange. Reverse ion-exchange may then be used to "fine-tune" the shape of the thin glass substrate after ion-exchange to the predetermined profile of curvature. For example, reverse ion-exchange may be used to remediate deviations from the predetermined shape caused by bending tolerances both in the tool or form used to impart the shape and/or in deficiencies in which the thin glass substrate matched the shaping tool or form. Furthermore, the step of reverse ion-exchange can be used to adjust for deviations from the predetermined profile of curvature resulting from variations in annealing histories of the surface regions residual from a thermal bending step. Finally, the reverse ion-exchange step can still also be applied to the treatment-disadvantaged surface region to remove variations in symmetry resulting from the physical characteristics of the glass such as the contamination of the surface regions by metallic tin on float produced substrates. The step of reverse ion-exchange thus provides a useful method for further modification to meet a proscribed tolerance for a predefined profile of curvature in a thin glass substrate which has been subject to a step of thermal bending before ion-exchange.

Figure 6:
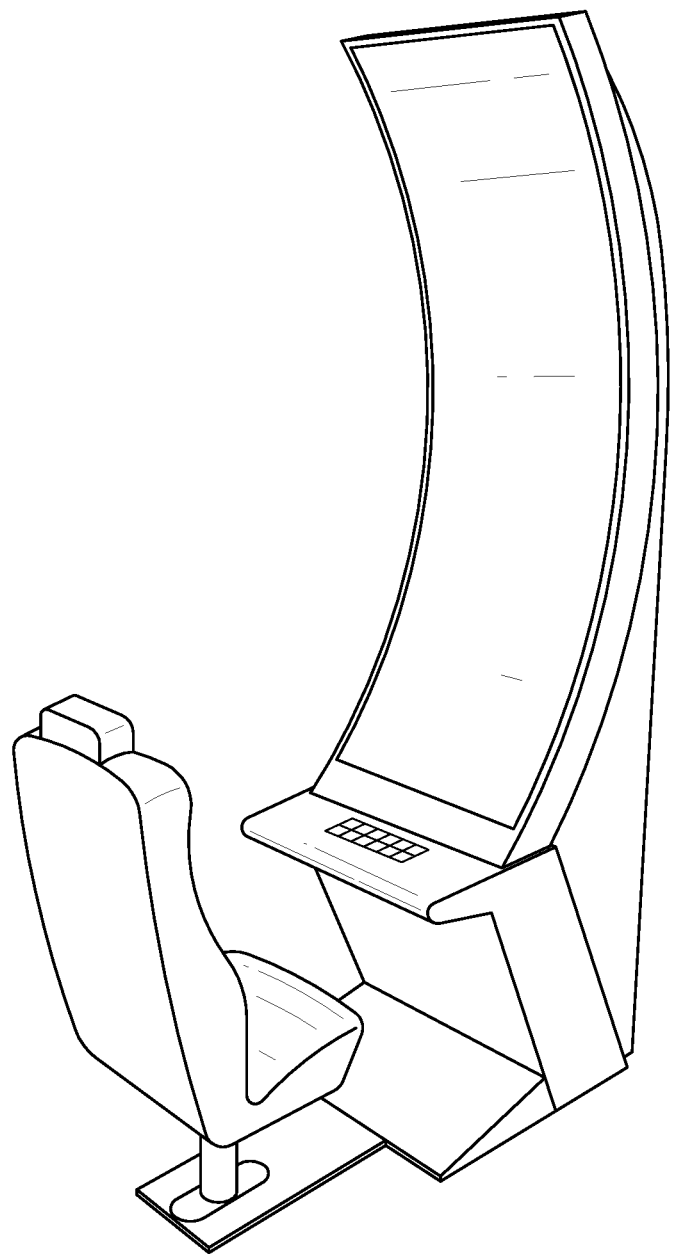
FIG. 6 is a sketch illustrating an exemplary embodiment of a large format gaming console containing a large touch screen display, wherein a chemically-strengthened thin glass substrate of the present invention having a predetermined profile of curvature is utilized in forming the touch screen.

FIG. 6 is a sketch illustrating a chemically-strengthened thin glass substrate of the present invention having a predetermined profile of curvature, which is utilized in forming the touch screen display of a large format gaming console.

The present invention also contemplates and provides for an alternative embodiment, wherein a previously obtained chemically-strengthened thin glass substrate is subject to reverse ion-exchange to impart at least one of the following properties thereto that is not present to the previously obtained chemically-strengthened thin glass substrate: a reduced curvature, or zero curvature, or a predetermined profile of curvature. The method comprises providing a chemically-strengthened reverse ion-exchange medium. The reverse ion-exchange medium may contain reversing alkali ions having an average ionic radius equal to, or smaller than, the average ionic radius of the host alkali ions before ion-exchange (of the obtained chemically-strengthened thin glass substrate) and/or smaller than the average ionic radius of the invasive ions applied during ion-exchange (of the obtained chemically-strengthened thin glass substrate). The method may comprise applying the reverse ion-exchange medium to a surface region of the thin glass substrate. The method may also comprise conducting reverse ion-exchange while applying the reverse ion-exchange medium to produce a chemically-strengthened substrate with a reduced or zero curvature or alternately a predetermined profile of curvature.

The methods put forward in this inventive disclosure allow for a glass substrate to become a high quality chemically-strengthened glass substrate suited to a particular glass application, be it one desiring of excellent flatness or to meet a proscribed tolerance for a predefined profile of curvature.

Exemplary Chemically-Strengthened Glass

Following reverse ion-exchange, the compressive stresses present in ion-exchanged glass exhibit enhanced symmetry between the treatment-advantaged and treatment-disadvantaged surface regions of the glass substrate where reduced or zero curvature is desired. Reverse ion-exchange allows differential speeds of alkali ion diffusion in the surface regions which otherwise occur under equivalent conditions of chemical-strengthening by ion-exchange to be nullified. This can occur regardless from where such curvature originates including that which may be the result of physical characteristics imparted by the basic method of glass substrate production, e.g., a fusion process verses a float process. This can also occur for curvature originating from purposeful changes to the physical characteristics of the glass sheet before chemical-strengthening such as for example barrier coatings, ion-implantation, fluorination, de-alkalization, etc; This can also occur for curvature originating from specific parameters of chemical-strengthening by ion-exchange applied differently to opposing surface regions such as for example those prior art techniques of manipulating time, temperature, the addition of poisoning additives to the ion-exchange medium, and/or changes to the areal-density of the ion-exchange medium, etc The treatment-advantaged surface region can in sum be adjusted to lose its advantage of greater compressive stresses compared to the treatment-disadvantaged surface region. While the state of greater equalization between the treatment-advantaged and treatment-disadvantaged surface is achieved in sum, it is noted the absolute level of compressive stress at the surface, the depth of compressive layer (DOL), and the compressive stress in the layers between the surface and zero point depth of compressive layer (DOL) where compressive stresses terminate often still differ regardless between surface regions. Furthermore, where the end goal is reduced or zero curvature, the symmetry of compressive stress in the opposing surface regions may also be slightly biased to offset any minor deviations from absolute flatness residual from the tolerances of primary production, fusion verses float.

The expansion of the volumes of the treatment-advantaged surface region and treatment-disadvantaged surface regions may be stated to be in greater balance, or symmetry, in sum following the step of reverse ion-exchange where reduced or zero curvature is desired. While the expansion of the surface regions which pivot about a central region of tension is asymmetrical during ion-exchange, the step of reverse ion-exchange allows the volume of the surface region to be reduced so that a state of equilibrium may be established between the opposing surface regions. The resulting dimensional differences between surface regions in sum are minimized and deformation of the thin chemically-strengthened glass substrate into a curved body is nullified. Indeed, it can be stated where reduced or zero curvature is desired that the asymmetry of salt-ion diffusion during ion-exchange may be minimized in sum by the step of reverse ion-exchange so the chemically-strengthened thin glass substrate reveals a reduced, or zero level, curvature from that of a true flat plane.

The curvature acceptable for thin chemically-strengthened glass sheets varies in accordance to the specific aesthetic and functional requirements of the application. Reduced curvature for the purpose of this disclosure may be broadly defined as a reduction exhibited after reverse-ion-exchange in the peak-to-valley height measurement as determined across a line drawn parallel with the long dimension of a glass sheet connecting between the short edge midpoints. Thus the curvature of a glass sheet measured before a process of reverse ion-exchange as compared to the curvature thereafter may exhibit a much reduced curvature with the shape being readily observed to have flattened. Such reduced curvature may be quantified in an absolute decline in the peak-to-valley height (i.e. the glass sheet is more closely parallel to a true flat plane). Such a peak-to-valley height, the deviation measurement along the z-axis from a true flat plane, may also be expressed as an equivalent radius or as a percentage of the linear span.

Reduced curvature may be defined in a thin chemically-strengthened glass sheet after reverse ion-exchange as exhibiting an equivalent radius of curvature which is equal to or greater than a preferred radius. The equivalent radius of the glass sheet may be calculated by measuring the length of a chord line drawn parallel with the long dimension of a glass sheet connecting between the short edge mid-points and then measuring the depth which is the peak-to-valley height along such a chord line. Accuracy of the depth measurement may be improved by supporting the glass sheet on the short edges, measuring the peak-to-valley height across the major face, then turning over the sheet and measuring the peak-to-valley on the opposing major face. The depth may be calculated as the difference between the two measurements divided by two (2). Regardless, the equivalent radius may be calculated by the formula radius= (chord$^2$+4 depth$^2$)/8 depth. The radius is preferably greater than 7,500 mm (295") inches), greater than 15,000 mm (591"), greater than 22,500 mm (886"), greater than 30,000 mm (1,181"), greater than 37,500 mm (1,476"), greater than 45,000 mm (1,771"), greater than 52,500 mm (2,067"), greater than 60,000 mm (2,362"), greater than 67,500 mm (2,657"), greater than 75,000 mm (2,953"), greater than 82,500 mm (3,248"), greater than 90,000 mm (3,543"), greater than 97,500 mm (3,839"), greater than 105,000 mm (4,134"), greater than 112,500 mm (4,429"), greater than 120,000 mm (4,724"), and most preferably greater than 127,500 mm (5,020").

Reduced curvature may be defined in a thin chemically-strengthened glass sheet after reverse ion-exchange as exhibiting a curvature which conforms to an amount proscribed as generally allowable within a particular industry and/or for a particular glass application. Such a generally allowable amount may be expressed as a maximum peak-to-valley height or as a percentage of the linear span. For handheld electronics applications such as cover glasses on mobile telephones, the acceptable curvature is no more than about 0.10% of the linear span corresponding to an allowable curvature of 0.1 mm for a 100 mm span. For electronic devices larger than handheld such as gaming machine touch screens, the acceptable curvature is no more than about 0.15% of the linear span corresponding to an allowable curvature of about 0.15 mm for a 100 mm span. For building applications in the United States of America, a generally acceptable curvature is no more than about 2.0 mm over a 1200 mm linear span (0.167%), 3.0 mm over 1500 mm (0.200%), 5.0 mm over 1800 mm (0.278%), 6.0 mm over 2100 mm (0.286%), 7.0 mm over 2400 mm (0.292%), 8.0 mm over 2700 mm (0.296%), and 10.0 mm over 3000 mm (0.333%).

Zero curvature by the strictest definition is defined as a glass sheet which exists as a flat plane when the effects of gravity and the means of support are removed. A more practical definition is a glass sheet which exhibits an absolute peak-to-valley distance of zero as determinable within the resolution and accuracy of the measuring instrument. However, the preferred definition of zero curvature is a glass sheet which exhibits a curvature which is at least equal to, or less than, a level of curvature which is an order of magnitude flatter than the level of curvature proscribed as generally acceptable within a particular industry and/or glass application (i.e. curvature measures no more than maximum allowable curvature reduced by a factor of 10). Thus for handheld electronics applications, "zero curvature" equates to a curvature no more than about 0.01% of the linear span corresponding to a curvature of about 0.01 mm for a 100 mm span. For electronic devices larger than those which are handheld, "zero curvature" equates to a curvature no more than about 0.015% of the linear span corresponding to a curvature of about 0.015 mm for a 100 mm span. For building applications in the United States of America, "zero curvature" equates to a curvature no more than about 0.2 mm over a 1200 mm span (0.017%).

The use of reverse ion-exchange as a method to achieve reduced or zero curvature imparts specific physical characteristics to the chemically-strengthened glass substrate. Specifically such characteristics can be analyzed by revealing the concentration of specific alkali metal ions species within the various depths of the surface regions of reverse ion-exchanged glass. The instrument used for such analysis is known in the art as a surface ablation cell (SAC). A surface ablation cell is a laboratory device consisting of a pump which transfers an etching solution across a glass surface region to thereby progressively disassemble the glass network and its constituents. Such dissolution occurs in progressive layers optionally proceeding through the diffusion depth until the depth of compressive layer is reached. As the glass network is dissolved, the resulting effluent may be diverted and categorized by the specific depth from within the glass network where it came for qualitative and quantitative analysis. For example, the effluent may be analyzed to determine the concentrations of alkali metal ions within a specific depth of the surface region and thereby reveal the specific characteristics of the inventive article.

In addition to flatness, the use of reverse ion-exchange as a method for attaining reduced or zero curvature results in specific physical characteristics in the chemical-strengthened glass not found in other methods which may be summarized as follows. Firstly, reverse ion-exchange reduces the concentration of larger alkali metal ions only from the surface to typically less than about 5 µm depth. Reverse ion-exchange is conducted quickly at a thermal profile (time at temperature) preferably insufficient to cause any substantial change (i.e., greater than 10%) to the level of surface compressive stress on the reverse ion-exchanged surface region. Secondly while reverse ion-exchange may be optionally performed on both surfaces, where reduced or zero curvature is desired it is normally, if not always, performed to a greater extent on the treatment-advantaged surface region than the treatment-disadvantaged surface region.

The result of these two paradigms is that the composition of the constituent alkali ions presents in these surface regions shifts. The absolute quantity of larger alkali ions may indeed differ between the two surfaces through the diffusion depth since one is treatment-advantaged and the other is treatment-disadvantaged. However more importantly, a shift needs to occur in the composition of the alkali ions since reverse ion-exchange causes more larger alkali metal ions to vacate from the treatment-advantaged surface region (its average ionic radius falls) in the depth extending from the surface to about 5 µm than in the treatment-disadvantaged surface region (its average ionic radius may also fall depending on if it also is subject to reverse ion-exchange but since reduced or zero curvature generally mandates reverse ion-exchange on the treatment-disadvantaged surface be conducted to a lesser extent, so its fall would normally be less precipitous).

Reverse ion-exchange again is conducted quickly at a thermal profile (time at temperature) preferably insufficient to cause meaningful change (i.e., greater than the resolution accuracy of the measuring instrument) to the composition of ions including the level and depth of compressive stress in the balance of the diffusion area of a reverse ion-exchanged surface region or in a surface region not subject to reverse ion-exchange. As a result, the region from about 5 µm to the diffusion depth retains composition of the constituent alkali ions present in these surface regions mostly from ion-exchange rather than reverse ion-exchange. Again, the absolute quantity of larger alkali ions may indeed differ between the two surfaces in the diffusion depth greater than about 5 µm since one is treatment-advantaged and the other is treatment-disadvantaged. However the composition of the alkali ions in this region reflects the bias of the initial ion-exchange treatment, namely more larger alkali metal ions are able to get down into the deeper depths greater than about 5 µm of the treatment-advantaged surface region due to an absence of blocking tin ions (that are associated with a tin float glass manufacturing process) or negative annealing history (that are associated with a fusion glass manufacturing process) and the average ionic radius of the alkali ions in this region is thus higher than in the treatment-disadvantaged surface region. Indeed if such a phenomenon was not present then it would not be possible for the chemically-strengthened glass substrate to reveal reduced or zero curvature in accordance with an advantageous embodiment of the present invention.

In contrast to the present invention, all other heretofore know methods in the relevant art are directed at attempting to reduce the overall difference in the concentration of larger invasive alkali ions as compared to smaller host alkali metal ions during the step of ion-exchange. Specifically these methods attempt to modify comparative rates of inter-diffusion which occurs in each surface region from the outermost surface to the depth of diffusion. For example, Kreski US '689 (US 2014/0178689) in its differential time disclosure and Varshneya et al. US '663 (US 2014/0178663) in its heat-treatment disclosure each attempt to increase the quantity of larger invasive alkali ions across the entire breadth of diffusion of the "treatment-poor" surface region by respectively lengthening the comparative time of inter-diffusion between surfaces or oxidizing the blocking tin ions. Similarly, the Kreski US '938 (U.S. Pat. No. 9,302,938) differential density patent disclosure, as well as the Kreski US '691 (US 2014/0178691) differential chemistry disclosure, which may be extended to include the disclosure on a metallic surface barrier film, each attempt to decrease the quantity of larger invasive alkali ions across the entire breadth of diffusion in the "treatment-rich" surface region of the glass substrate. Indeed in none of these earlier disclosures is there any discussion of relaxing compressive stress in a surface region to adjust curvature after strengthening by ion-exchange.

It is only the reverse ion-exchange concept and framework that are set forth in this disclosure that instead accepts the differential diffusion rates between surface regions during ion-exchange for what they are, quantifies them, and then allows one in an inventive embodiment herein disclosed to slightly and selectively remove larger invasive alkali-ions from the "treatment-advantaged" surface region to a shallow depth so as to achieve greater symmetry of expansion in sum between the two surface regions. Furthermore, the reverse ion-exchange concept and framework allows changes to such symmetry to be purposefully biased to offset any undesired curvature present in the glass substrate before ion-exchange in order to achieve a desired reduction or absence of curvature. Finally, the reverse ion-exchange concept and framework that are set forth in this disclosure also allows manipulation of such symmetry between surface regions to be exploited in order to achieve a desired predetermined profile of curvature not present in the glass prior to reverse ion-exchange.

The identification of opposing surface regions as treatment-advantaged or treatment-disadvantaged after reverse ion-exchange may be defined by the curvature exhibited after chemical-strengthening by ion-exchange and before reverse ion-exchange. Indeed one may only need measure the comparative asymmetry manifested in the physical shape of the glass sheet, the direction of curvature, exhibited before chemical-strengthening by ion-exchange as compared to that which is exhibited after chemical-strengthening by ion-exchange to identify the opposing surface regions as treatment-advantaged or treatment-disadvantaged. The treatment-advantaged surface region has a comparatively larger volume and thereby exhibits additional curvature toward the comparatively smaller volume of the treatment-disadvantaged surface region. From such an observation it may be readily concluded the surface region identified as treatment-advantaged has progressed further in the substitution of larger invasive alkali ions for smaller host alkali-ions. However the inventive step of using reverse ion-exchange to counter differential curvature on opposing surface regions so as to result in an article of a thin chemically-strengthened glass sheet exhibiting reduced curvature or zero curvature may require identification of the comparative surface regions without knowledge of their condition before reverse ion-exchange.

Regardless of any remediation by reverse-exchange, previous asymmetry between treatment-advantaged and treatment-disadvantaged surface regions following chemical-strengthening by ion-exchange which resulted primarily from differing physical characteristics imparted by the basic method of production remain readily identifiable in the thin chemically-strengthened glass sheet after reverse ion-exchange. Indeed on an unadulterated glass substrate subject to equivalent parameters of chemical-strengthening ion-exchange, the surface region which was treatment-disadvantaged following chemical-strengthening by ion-exchange still thereafter retains the physical characteristics imparted by the basic method of production. In the case of float produced sheets, a greater concentration of metallic tin ions still exists in the treatment-disadvantaged surface region compared to the opposing treatment-advantaged surface region following reverse ion-exchange. In the case of fusion produced sheets, a differential annealing history still exists in the opposing surface regions following reverse ion-exchange.

Furthermore, determination of which surface regions were remediated by reverse ion-exchange after chemical-strengthening by ion-exchange may also be readily identified by the propensity of the opposing surface regions to accept invasive alkali ion upon additional chemical-strengthening by ion-exchange. For example when a thin chemically-strengthened glass sheet following reverse ion-exchange is again subjected to chemical-strengthening by ion-exchange with equivalent parameters on opposing surface regions. The condition of the opposing surface regions as treatment-advantaged or treatment-disadvantaged prior to reverse ion-exchange quickly returns. For example smaller reversing ions previously applied during reverse ion-exchange to a treatment-advantaged surface region (or indeed to a treatment-disadvantaged surface region) rapidly exchange back out of the typically shallow depth of their penetration into the glass and thereby quickly reveal the surface region bias existing before remediation by reverse ion-exchange.

Thus, there is also provided an article which includes a chemically-strengthened glass substrate with reduced curvature or zero curvature or a predetermined profile of curvature having a chemical structure which includes alkali metal ions. The glass substrate contains a treatment-advantaged surface region and a treatment-disadvantaged surface region located opposing each other. The treatment-disadvantaged surface region and the treatment-advantaged surface region each extend to a diffusion depth of alkali metal ions which are in a concentration greater in the surface regions than in the remaining glass substrate. In a float produced glass substrate, the treatment-disadvantaged surface region and the treatment-advantaged surface region each contain tin ions. In one embodiment of the article, the treatment-disadvantaged surface region contains tin ions in a concentration greater than in the treatment-advantaged surface region. In another embodiment of the article, the treatment-disadvantaged surface region has a different annealing history than the treatment-advantaged surface region. In a depth extending from the surface to about 5 μm, the average ionic radius of the alkali metal ions located in the treatment-disadvantaged surface region is greater than the average ionic radius of the alkali ions located in the treatment-advantaged surface region, and in a depth extending from about 5 μm to the depth of diffusion, the average ionic radius of the alkali metal ions located in the treatment-advantaged surface region is greater than the average ionic radius of the alkali ions located in the treatment-disadvantaged surface region.

Reverse exchange may instead be discussed as an alternate embodiment in accordance with the mass of the invasive alkali ion species, that is those alkali ions present in the glass substrate which have an average ionic radius larger than the average ionic radius of the host alkali ions or reversing alkali ions in the glass substrate. Following chemical-strengthening by ion-exchange, one compressed surface region is treatment-advantaged and penetrated by a greater total mass of the invasive alkali ion species and thus exhibits a greater physical volume curving toward an opposing surface region which is treatment-disadvantaged and penetrated by a lesser total mass of the invasive alkali ion species and thus exhibits a lesser physical volume. Where the objective is to obtain a reduced curvature or zero curvature then reverse-exchange may be conducted to obtain a targeted reduction from the surface inwards in the mass of the invasive alkali ion species within the treatment-advantaged surface region and thereby reduce its physical volume. Thus reverse-exchange may be conducted so as to reduce the mass of the invasive alkali ion species within the thickness from the surface to about 5 μm depth on the treatment-advantaged surface region and in an amount exceeding any corresponding reduction to the mass of the invasive alkali ion species within the thickness from the surface to about 5 μm depth on the treatment-disadvantaged surface region.

The reduction in the mass of the invasive alkali ion species within the surface to a depth of about 5 μm on the treatment-advantaged surface region causes a concordant reduction in the physical volume of this region. This reduction in physical volume creates a strong force of oppositely directed curvature which is superimposed at an efficient counterbalance point of pivot over the curvature still present as a result of the remaining volume differences in the deeper surface regions. Such remaining volume differences are because the mass of the invasive alkali ion species within the thickness from about 5 μm to the depth of diffusion on the treatment-advantaged surface region is greater than the mass of the invasive alkali ion species within the thickness from about 5 μm to the diffusion depth on the treatment-disadvantaged surface region. Thus in one embodiment, the treatment-disadvantaged surface region may from the surface to a depth of about 5 μm contain a greater mass of the invasive alkali ion species than the opposing treatment-advantaged surface region from the surface to a depth of about 5 μm. Furthermore, the treatment-advantaged surface region from about 5 μm to its depth of diffusion may contain a greater mass of the invasive alkali ion species as compared to the opposing treatment-disadvantaged surface region from about 5 μm to its depth of diffusion.

Thus, there is also provided an article which includes a chemically-strengthened glass substrate with reduced curvature or zero curvature or a predetermined profile of curvature having a chemical structure which includes alkali metal ions. The glass substrate contains a treatment-advantaged surface region and a treatment-disadvantaged surface region located opposing each other. The treatment-disadvantaged surface region and the treatment-advantaged surface region each extend to a diffusion depth of alkali metal ions which are in a concentration greater in the surface regions than in the remaining glass substrate. In a float produced glass substrate, the treatment-disadvantaged surface region and the treatment-advantaged surface region each contain tin ions. In one embodiment of the article, the treatment-disadvantaged surface region contains tin ions in a concentration greater than in the treatment-advantaged surface region. In a depth extending from the surface to about 5 µm, the mass of the invasive alkali ion species located in the treatment-disadvantaged surface region is greater than the mass of the invasive alkali ion species located in the treatment-advantaged surface region, and in a depth extending from about 5 µm to the depth of diffusion, the mass of the invasive alkali ion species located in the treatment-advantaged surface region is greater than the mass of the invasive alkali ion species located in the treatment-disadvantaged surface region.

However the above definition of such an inventive article may not adequately cover some instances encompassed hereby where the treatment-advantaged and treatment-disadvantaged surface regions are deliberately manipulated beyond the physical characteristics imparted by the basic method of production. Such deliberate manipulation may include the purposeful addition of other physical characteristics within the glass sheet before chemical-strengthening such as for example barrier coatings, ion-implantation, fluorination, de-alkalization, etc; Indeed, those embodiments of the inventive article which include a float produced glass substrate may also contain fluorine ions in each of the opposing surface regions, and that surface which contains fluorine ions is opposed to that surface which contains in a greater concentration tin ions. Such deliberate manipulation may also include specific parameters of chemical-strengthening by ion-exchange applied differently to opposing surface regions such as for example those prior art techniques of manipulating time, temperature, the addition of poisoning additives to the ion-exchange medium, and/or changes to the areal-density of the ion-exchange medium, etc;

Hereto forth throughout the disclosure the term "in a depth extending from the surface to about 5 µm" is used to demarcate an equivalent depth region in the opposing surfaces from the outermost surface to a nominal depth which is typically most differently affected in sum following a process of reverse ion-exchange. Conversely throughout the disclosure the term "in a depth extending from about 5 µm to the depth of diffusion" is used to demarcate an equivalent depth region in the opposing surfaces from a nominal depth to a depth of diffusion which is typically least differently affected in sum following a process of reverse ion-exchange. However the actual depth where demarcation between the depth regions of opposing surfaces which are most or least differently affected following a process of reverse ion-exchange depends on many factors including the specific parameters of ion-exchange, the specific parameters of reverse ion-exchange, as well as the physical characteristics of the glass sheet. This may be especially true following purposeful manipulation including the addition of other physical characteristics within the glass sheet before chemical-strengthening or specific parameters of chemical-strengthening by ion-exchange applied differently to opposing surface regions. Indeed such a nominal depth may instead preferably be 3 microns, 4 microns, 6 microns, 7 microns, 8 microns, 9 microns, 10 microns, or 15 microns, or more as adjustments to the aforementioned factors results in unanticipated changes to the equivalent depth region most vs. least differently affected in sum following a process of reverse ion-exchange, particularly with regard to average ionic radius of the alkali metal ions or the comparative greater mass of the invasive alkali ion species.

Thus, there is an article of manufacture which includes a chemically-strengthened substrate made by a process such as herein described. The process may comprise providing a thin glass substrate with a chemical structure. The glass chemical structure may contain host alkali ions having an average ionic radius situated in the surface region. The glass substrate may contain a treatment-advantaged surface region and a treatment-disadvantaged surface region located opposing each other. The process may comprise providing an ion-exchange medium. The ion-exchange medium may contain invasive alkali ions having an average ionic radius that is larger than the average ionic radius of the host alkali ions. The process may comprise applying the ion-exchange medium to the glass surface regions. The process may comprise conducting ion-exchange while applying the ion-exchange medium to produce a chemically-strengthened substrate. The process may comprise providing a reverse ion-exchange medium. The reverse ion-exchange medium may contain reversing alkali ions having an average ionic radius that is equal to, or smaller than, the average ionic radius of host alkali ions before ion-exchange and/or it may contain reversing alkali ions smaller than the average ionic radius of the invasive ions applied during ion-exchange. The process may include applying the reverse ion-exchange medium to at least a treatment-advantaged surface region and conducting reverse ion-exchange while applying the reverse ion-exchange medium to produce a chemically-strengthened substrate having less curvature than was present in the chemically-strengthened glass substrate prior to reverse ion-exchange. The process may instead include applying the reverse ion-exchange medium to at least one of a treatment-advantaged surface region or a treatment-disadvantaged surface region and conducting reverse ion-exchange while applying the reverse ion-exchange medium to produce a chemically-strengthened substrate having a predetermined profile of curvature which was not present in the chemically-strengthened glass substrate prior to reverse ion-exchange.

EXAMPLES

The following examples demonstrate methods of making chemically-strengthened glass having reduced or zero curvature, or a predetermined profile of curvature, utilizing a reverse ion-exchange methodology. Reference is made to the graph in FIG. 2 in the examples. The graph shows the deflection of exemplary chemically-strengthened substrates both before and after reverse ion-exchange is conducted at a defined thermal profile of time at temperature. The time at temperature values are shown as the right-hand and bottom scales of the graph, respectively. The deflection measurement for a flat glass having 412 mm span is given in millimeters as shown on the left-hand axis of the graph. Deflection is determined from the surface profile measured by an optical non-contact micrometer to obtain deflection as the peak-to-valley height determined across a line drawn parallel with the long dimension connecting between the short edge mid-points.

In the tables which follow, CS is the level of surface compressive stress, DOL is the depth of compressive layer, and CT is the level of central tension. Throughout the tables within this examples section the following methodology was used: the level of surface compressive stress, depth of layer, and central tension were measured using an FSM-7000H Surface Stress Meter as purchased from the Luceo Co, Ltd of Tokyo, Japan.

Example 1—Reverse Ion-Exchange

Sample Preparation: Sodium alkali-aluminosilicate glass coupons, 412 mm width×127 mm length and with a 0.55 mm thickness, were cut from different mother sheets of thin glass substrate produced by the float process. The edges as well as both surface regions—that is, the treatment-advantaged surface region and the treatment-disadvantaged surface region—were submerged in a uniform liquid ion-exchange medium of potassium nitrate (KNO$_3$) at a temperature of 432° C. for a period of 210 minutes to conduct strengthening by ion-exchange. Immediately following ion-exchange the coupons were cleaned using warm de-ionized water. The results were as follows:

Sample A

The measured curvature in the glass coupon was a positive 7.1 mm deflection over 412 mm.

| SURFACE REGION | CS | DOL | CT |
| --- | --- | --- | --- |
| Treatment-Disadvantaged Surface (Tin Side) | 728 MPa | 45.7 μm | 36.1 MPa |
| Treatment-Advantaged Surface (Non-Tin Side) | 736 MPa | 48.0 μm | 39.2 MPa |

Sample B

The measured curvature in the glass coupon was a positive 5.6 mm deflection over 412 mm.

| SURFACE REGION | CS | DOL | CT |
| --- | --- | --- | --- |
| Treatment-Disadvantaged Surface (Tin Side) | 716 MPa | 45.3 μm | 35.7 MPa |
| Treatment-Advantaged Surface (Non-Tin Side) | 725 MPa | 46.2 μm | 36.8 MPa |

Sample C

The measured curvature in the glass coupon was a positive 3.2 mm deflection over 412 mm.

| SURFACE REGION | CS | DOL | CT |
| --- | --- | --- | --- |
| Treatment-Disadvantaged Surface (Tin Side) | 735 MPa | 43.4 μm | 35.0 MPa |
| Treatment-Advantaged Surface (Non-Tin Side) | 751 MPa | 48.1 μm | 40.0 MPa |

The deflection measurements of sample A, B, and C are shown on the left hand data points at a temperature of 25° C. after strengthening by ion-exchange but before selective surface relaxation by reverse ion-exchange. These data points are denoted by black circles containing an "x" on the graph in FIG. 2.

Sample Processing: The same sodium alkali-aluminosilicate glass coupons already chemical-strengthened by ion-exchange were then subject to different configurations of reverse ion-exchange.

A eutectic salt mixture in a ratio (w/w) of 1 to 1 of sodium nitrate (NaNO$_3$) and sodium carbonate (Na$_2$CO$_3$) was created and dissolved in de-ionized water to create an aqueous salt solution. The glass coupons were preheated to a temperature of approximate 150° C. and the aqueous salt solution was applied by a spray method onto only the ion-exchange treatment-advantaged surface (Non-Tin Side). The water in the solution quickly evaporated from the surface leaving behind a solid reverse ion-exchange medium characterized as a eutectic coating on the glass surface of two crystallized salt compounds containing reversing alkali ions of sodium covering the full face of the sprayed surface region. The crystallized salt compounds may best be described as having a consistency similar to the appearance of ice on the surface of an automotive windshield. The amount of sodium salts present on the sprayed surface was found to be approximately 16.1 grams per square meter. Immediately thereafter the coupons were inserted into a furnace to conduct reverse ion-exchange with the application of heat definable by a thermal profile of time at temperature. The time at temperature to which the coupons were exposed was as follows:

Sample A

371° C. for 8 Minutes.

Sample B

349° C. for 4 Minutes.

Sample C

310° C. for 4 Minutes.

Figure 2:
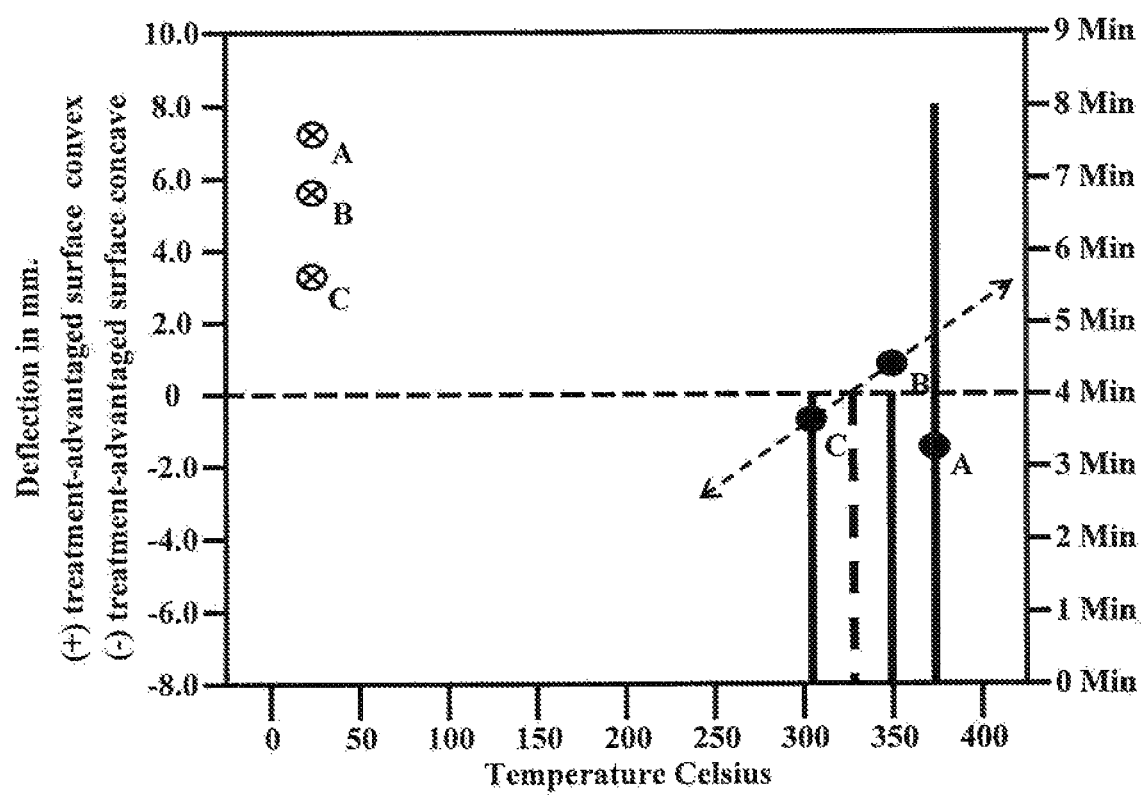
FIG. 2 is a graph showing the deflection of exemplary chemically-strengthened thin glass substrates both before and after reverse ion-exchange is conducted at a defined thermal profile of time at temperature.

The above times and temperatures are time at temperature and exclude a short period of heat-up and cool-down. The thermal profiles are denoted by the vertical black lines on the graph in FIG. 2 representing time at temperature.

Results: Immediately following reverse ion-exchange the coupons were cleaned using warm de-ionized water and the results were as follows:

Sample A

The measured curvature in the glass coupon was a negative 1.6 mm deflection over 412 mm.

| SURFACE REGION | CS | DOL | CT |
| --- | --- | --- | --- |
| Treatment-Disadvantaged Surface (Tin Side) | 727 MPa | 45.4 μm | 33.5 MPa |
| Treatment-Advantaged Surface (Non-Tin Side) | 699 MPa | 47.0 μm | 36.3 MPa |

Sample B

The measured curvature in the glass coupon was a positive 0.8 mm deflection over 412 mm.

| SURFACE REGION | CS | DOL | CT |
| --- | --- | --- | --- |
| Treatment-Disadvantaged Surface (Tin Side) | 723 MPa | 44.8 μm | 35.6 MPa |
| Treatment-Advantaged Surface (Non-Tin Side) | 677 MPa | 48.8 μm | 36.6 MPa |

Sample C

The measured curvature in the glass coupon was a negative 0.8 mm deflection over 412 mm.

| SURFACE REGION | CS | DOL | CT |
| --- | --- | --- | --- |
| Treatment-Disadvantaged Surface (Tin Side) | 745 MPa | 44.9 μm | 36.8 MPa |
| Treatment-Advantaged Surface (Non-Tin Side) | 748 MPa | 45.8 μm | 37.8 MPa |

Reverse ion-exchange was conducted while the eutectic coating of two crystallized salt compounds containing reversing alkali ions was applied to the treatment-advantaged surface (i.e., the surface region corresponding to the non-tin side of the glass) by exposure to a specific thermal profile of time at temperature. It is important to note from the tables that there was no substantial reduction, i.e., greater than 10%, in the surface compressive stress on the treatment-advantaged surface region following reverse ion-exchange. Indeed, the greatest change was −48 MPa on sample "B" which is indicative of mild stress relaxation (about 6.5%) and which is greater than the +/−20 MPa resolution accuracy for each instrument reading. However, there was no meaningful change (i.e., greater than the resolution accuracy of the measuring instrument) on the treatment-disadvantaged surface regions which were not subject to reverse ion-exchange but which were exposed to the thermal profile during the reverse ion-exchange step. Indeed, the greatest change was +10 MPa on sample "C" which was within the +/−20 MPa resolution accuracy for each instrument reading. Additionally there was no meaningful change in the depth of diffusion of any surface region with the greatest change being −2.3 μm on sample "C" which was within the +/−5 μm resolution accuracy for each instrument reading.

The resulting deflection for samples A, B, and C is then measured and shown on the right hand data points. These data points are denoted by solid black circles on the graph in FIG. 2. Again deflection is determined from the surface profile measured by an optical non-contact micrometer to obtain deflection as the peak-to-valley height determined across a line drawn parallel with the long dimension connecting between the short edge mid-points. The deflection which results from the thermal profile of time at temperature is denoted by the solid black circles on the graph in FIG. 2. It is noted reverse ion-exchange conducted at a lower temperature requires a longer time period with a given reverse ion-exchange medium to achieve greater stress relaxation (i.e., net movement in curvature).

Note that from the graph an ideal flatness, a zero curvature, is approximately attained by conducting a reverse ion-exchange step for approximately a 4 minute time at a temperature of 330° C. Of course, this ideal time and temperature may be adjusted depending upon the net curvature revealed in the glass substrate following strengthening by ion-exchange. However the principal remains firm, and the ideal temperature and time for an identical ion-exchange medium is denoted by the finely dotted line with arrows at the ends on the graph in FIG. 2. Of course a time period other than 4 minutes or a temperature other than 330° C. could be used provided data points were also plotted with the induced deflection after reverse ion-exchange. Furthermore it is important again to state that the times are short, not being longer than 8 minutes in the examples provided herein. Also the temperatures are lower, no more than 371° C. in the examples provided herein. It is noted that the net movement of sample "A" at a temperature of 371° C. went from +7.1 mm deflection after ion-exchange to −1.6 mm, for a substantial net movement of −8.7 mm.

Example 2—Reduction of Previously Induced Curvature

The starting material is a soda-lime silicate glass sample 50 mm×50 mm length and with a 1.0 mm thickness, cut from a larger sheet formed by a tin float glass process. The sample is chemically-strengthened by submersion into molten potassium nitrate ($KNO_3$) at 432° C. for 4 hours. The sample is then cooled and rinsed with water to remove solidified salt. The deflection of the chemically-strengthened glass sample is 61 microns.

A 1:1 (w/w) ratio mixture of sodium nitrate ($NaNO_3$) and sodium carbonate ($Na_2CO_3$) is dissolved in 80° C. water. The solution is sprayed onto the non-tin side of the chemically-strengthened glass sample, which is preheated to 150° C. The water evaporates, and a smooth layer of the salt is deposited across the full face on the non-tin side of the sample (the treatment-advantaged surface region). The salt is sprayed in an amount which provides a density of 16 grams of salt per square meter of glass surface. The glass is heated to 349° C. and maintained at that temperature for 4 minutes. The salt is then washed off the glass by spraying the coated glass with warm water. There is a decrease in the curvature of the glass sample of approximately 92%, to 5 microns.

For electronics applications such as cover glasses on handheld mobile telephones, the acceptable curvature is about 0.1% of the linear span corresponding to an allowable curvature of 50 microns for a 50 mm span which the sample coupon satisfies. Furthermore the exhibited curvature of the coupon is no more than 0.01% of the linear span (5 microns) so in this example the coupon also satisfies the definition for "zero curvature" since the exhibited curvature is less than or equal to 0.01% of the linear span, the level at which the curvature is an order of magnitude (factor of ten) less than the 0.1% proscribed as generally acceptable within the electronics industry for use in cover glass applications on handheld phones.

Example 3—Reduction of Previously Induced Curvature

The starting material is a sodium alkali-aluminosilicate glass sample 50 mm×50 mm length and with a 0.55 mm thickness, cut from a larger sheet formed by a tin float glass process. The sample is chemically-strengthened by submersion into molten potassium nitrate ($KNO_3$) at 432° C. for 4 hours. The sample is then cooled and rinsed with water to remove solidified salt. The deflection of the chemically-strengthened glass sample is 82 microns.

A 1:1 (w/w) ratio mixture of sodium nitrate ($NaNO_3$) and sodium carbonate ($Na_2CO_3$) is dissolved in 80° C. water. The solution is sprayed onto the non-tin side of the chemically-strengthened glass sample, which is preheated to 150° C. The water evaporates, and a smooth layer of the salt is deposited across the full face on the non-tin side of the sample (the treatment-advantaged surface region). The salt is sprayed in an amount which provides a density of 16 grams of salt per square meter of glass surface. The glass is heated to 349° C. and maintained at that temperature for 4 minutes. The salt is then washed off the glass by spraying the coated glass with warm water. There is a decrease in the curvature of the glass sample of approximately 87%, to 11 microns.

For electronics applications such as cover glasses on handheld mobile telephones, the acceptable curvature is about 0.1% of the linear span corresponding to an allowable curvature of 50 microns for a 50 mm span which the sample coupon satisfies.

Example 4—Purposefully Induced Profile of Curvature by Reverse Ion-Exchange

The starting material is a sodium alkali-aluminosilicate glass sample measuring 412 mm width×127 mm length and with a 0.55 mm thickness, cut from a larger sheet formed by a tin float glass process. The sample is chemically-strengthened by submersion into molten potassium nitrate ($KNO_3$) at 432° C. for 4 hours. The sample is then cooled and rinsed with water to remove solidified salt. The deflection of the chemically-strengthened glass sample is 6.7 mm.

A 1:2 (w/w) ratio mixture of sodium nitrate ($NaNO_3$) and sodium carbonate ($Na_2CO_3$) is dissolved in 80° C. water. The solution is sprayed onto the non-tin side of the chemically-strengthened glass sample, which is preheated to 150°

C. The water evaporates, and a smooth layer of the salt is deposited across the full face on the tin side of the sample (the treatment-disadvantaged surface region). The salt is sprayed in an amount which provides a density of 16 grams of salt per square meter of glass surface. The glass is heated to 314° C. and maintained at that temperature for 6 minutes. The salt is then washed off the glass by spraying the coated glass with warm water. There is an increase in the curvature of the glass sample by approximately 119%, to 14.7 mm.

For an example embodiment of a touch screen display in a large format gaming console, the predefined profile of curvature required is a spherical 1,500 mm radius which equates to a depth of bend of 14.2 mm over a span of 412 mm. The acceptable proscribed tolerance for the predefined profile of curvature is +/−1.0 mm on the depth of bend which the sample coupon satisfies.

Example 5—Exemplary Process

Figure 3:
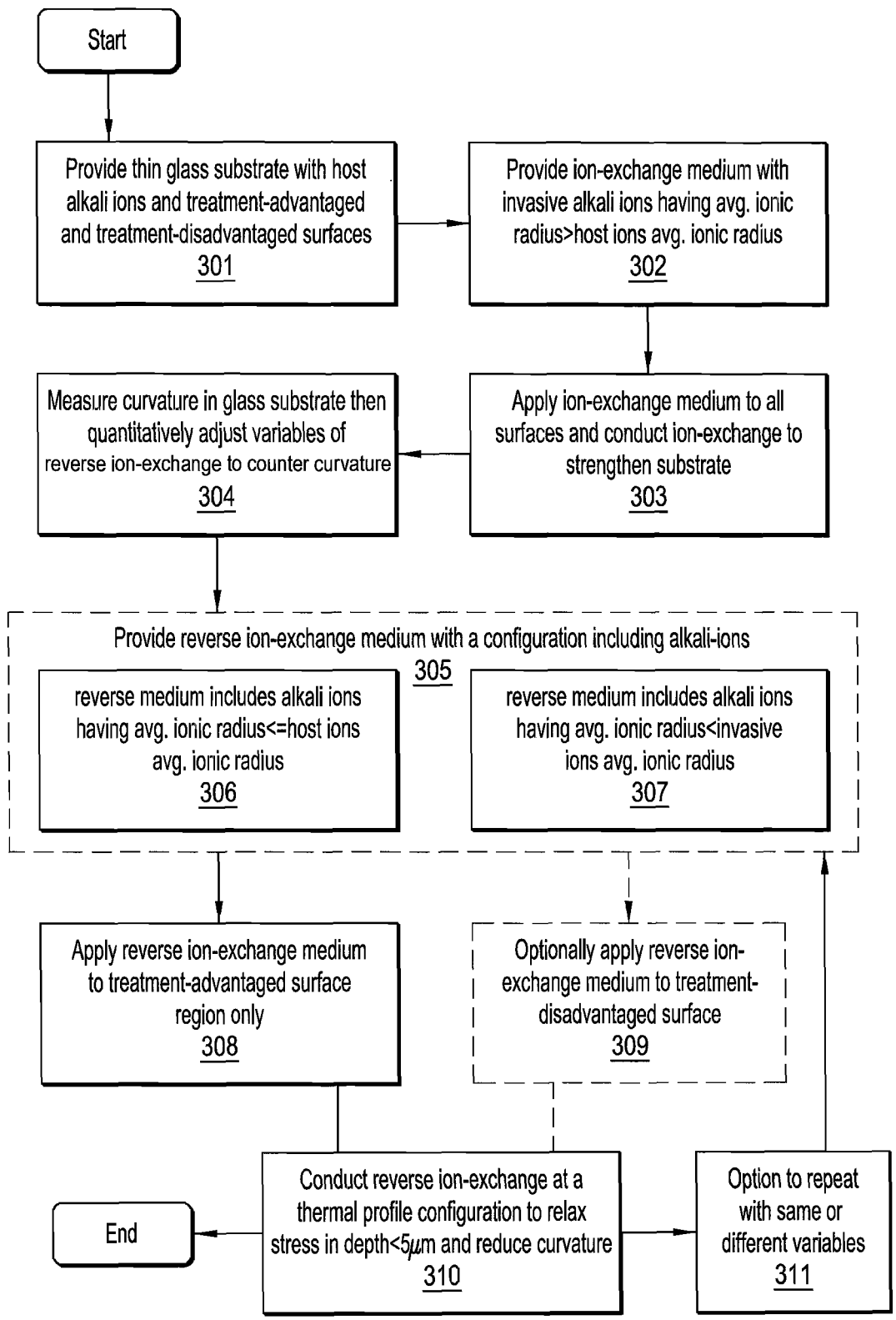
FIG. 3 is a flowchart illustrating an exemplary process for making a chemically-strengthened thin glass substrate according to the present invention.

FIG. 3 is a flowchart illustrating an exemplary process for making a chemically-strengthened substrate in accordance with an advantageous embodiment provided in the present disclosure. At step 301 of FIG. 3, a thin glass substrate is provided with a chemical structure. The glass chemical structure contains host alkali ions having an average ionic radius situated in the surface region. The glass substrate has a treatment-advantaged surface region and a treatment-disadvantaged surface region located opposing each other. At step 302, an ion-exchange medium is provided which contains invasive alkali ions having an average ionic radius that is larger than the average ionic radius of the host alkali ions. At step 303, the ion-exchange medium is applied to the all of the glass surfaces and ion-exchange is conducted while applying the ion-exchange medium to produce a chemically-strengthened substrate.

The exemplary process continues at step 304 where the curvature in the glass substrate is measured by non-contact scanner and then variables of reverse ion-exchange are quantitatively adjusted to counter curvature, most preferably in a single first attempt, although not being specifically limited thereto. The step of reverse ion-exchange may be conducted with varying parameters. At step 304, adjustments may be made to the modification of the curvature of the thin glass substrate during reverse ion-exchange on one or more surface regions, or partial areas thereof, by variation to at least one of time, temperature, and configuration of the reverse ion-exchange medium.

At step 305, a reverse ion-exchange medium is provided. At step 305, adjustments may be made to the modification of the curvature of the thin glass substrate during reverse ion-exchange by variation to at least one of volume of the reverse ion-exchange medium, the species of reversing alkali ions contained therein, the concentration of a species of reversing alkali ions contained therein, and the inclusion of additives therein which modify the rate of reverse ion-exchange.

At step 306, the reverse ion-exchange medium contains reversing alkali ions having an average ionic radius that may be equal to, or smaller than, the average ionic radius of host alkali ions in the glass substrate before ion-exchange. At step 307, the reverse ion-exchange medium contains reversing alkali ions having an average ionic radius that is smaller than the average ionic radius of invasive alkali ions in the glass substrate before ion-exchange.

At step 308, the reverse ion-exchange medium is applied to at least a treatment-advantaged surface region and reverse ion-exchange is conducted while applying the reverse ion-exchange medium. The preferred method is to conduct reverse ion-exchange on only the treatment-advantaged surface region of the glass substrate.

However, at step 309 reverse ion-exchange may also be conducted on the treatment-disadvantaged surface to also relax some of its compressive stress, provided the relaxation of stress is less in sum than the treatment-advantaged surface. The reverse ion-exchange of one surface region, both surface regions, or parts thereof may be conducted simultaneously, sequentially, and in another sequence or combination of sequences.

At step 310, reverse ion-exchange is conducted at a thermal profile configuration while applying a reverse ion-exchange medium to mildly relax compressive stress on the treatment-advantaged region from the surface to preferably about 5 µm in depth so as to attain reduced or zero curvature in the chemically-strengthened glass substrate. Reverse ion-exchange may be conducted with more than one thermal profile of time at temperature and/or with more than one configuration of reverse ion-exchange medium. Regardless, the thermal profile for reverse ion-exchange is preferably a specific combination of time at temperature suitable minimize changes to the level and depth of compressive stress across the entire compressed surface regions as a whole.

As an alternative step 311 in the process, the process of reverse ion-exchange may be repeated with the same or different variables if the reduction of curvature in the chemically-strengthened substrate is considered to be insufficient. If the compressive stress on the treatment-advantaged surface has been too greatly reduced and the curvature has become negative, then reverse ion-exchange may be conducted on the treatment-disadvantaged surface region to induce curvature in the opposite direction and thereby remove a negative curvature condition. Upon conclusion, there is a chemically-strengthened substrate having less curvature than was present in the chemically-strengthened glass substrate prior to reverse ion-exchange.

As another alternative step in the process, a reverse ion-exchange medium is applied to at least one of a treatment-advantaged surface region or a treatment-disadvantaged surface region and reverse ion-exchange is conducted while applying the reverse ion-exchange medium. Reverse ion-exchange may also be conducted on an opposing surface region. The reverse ion-exchange of one or more surface regions, or parts thereof, may be conducted simultaneously, sequentially, and in another sequence or combination of sequences.

As another alternative step in the process, reverse ion-exchange is conducted at a thermal profile configuration while applying a reverse ion-exchange medium to mildly relax compressive stress on at least one of the treatment-advantaged or treatment-disadvantaged surface region from the surface to preferably about 5 µm in depth to thereby mildly lessen or enhance the curvature so as to attain a predetermined profile of curvature in the chemically-strengthened glass substrate. Reverse ion-exchange may be conducted with more than one thermal profile of time at temperature and/or with more than one configuration of reverse ion-exchange medium. Regardless, the thermal profile for reverse ion-exchange is preferably a specific combination of time at temperature suitable to minimize changes to the level and depth of compressive stress across the entire compressed surface regions as a whole.

As another alternative step in the process, the process of reverse ion-exchange may be repeated with the same or different variables if the reduction or increase to the profile of curvature in the chemically-strengthened substrate is considered to be insufficient. If the compressive stress on a reverse ion-exchanged region has been too greatly reduced, then reverse ion-exchange may be conducted on an opposing surface region to induce curvature in the opposite direction and thereby still attain the predetermined profile of curvature. Upon conclusion, there is a chemically-strengthened substrate having a predetermined profile of curvature which was not present in the chemically-strengthened glass substrate prior to reverse ion-exchange.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the principles of the invention. While the examples have been described with reference to the figures, those skilled in the art are able to make various modifications to the described examples without departing from the scope of the following claims, and their equivalents.

What is claimed is:

1. A method of producing a chemically-strengthened glass substrate, which comprises the following steps:
    providing a glass substrate having a chemical structure which contains host alkali ions having an average ionic radius situated in the surface regions thereof;
    presenting an ion-exchange medium which contains invasive alkali ions having an average ionic radius larger than the average ionic radius of the host alkali ions to surface regions of the substrate; and
    conducting ion-exchange while presenting the ion-exchange medium to the glass surface regions, thereby building compressive stress in the ion-exchanged surface regions and producing a chemically-strengthened glass substrate;
    said chemically strengthened glass substrate having compressive stress which is asymmetric between a treatment-advantaged surface region and an opposing treatment-disadvantaged surface region, and wherein said asymmetric compressive stress between opposing surface regions causes undesired curvature to the glass substrate;
    providing a reverse ion-exchange medium which contains alkali ions having an average ionic radius that is smaller than the average ionic radius of the invasive ions contained in the ion-exchange medium; and
    (1) presenting the reverse ion-exchange medium to only a treatment-advantaged surface region within at least an area of the opposing surface regions and conducting reverse ion-exchange while presenting the reverse ion-exchange medium to lessen the compressive stress in said surface region relative to the treatment disadvantaged surface region opposing and thereby produce a chemically-strengthened substrate having less curvature than is present in the chemically-strengthened glass substrate prior to reverse ion-exchange, or
    (2) presenting the reverse ion-exchange medium to only one of a treatment-advantaged surface region or a treatment-disadvantaged surface region within at least an area of the opposing surface regions and conducting reverse ion-exchange while presenting the reverse ion-exchange medium to lessen the compressive stress in said surface region relative to the surface region opposing and thereby produce a chemically-strengthened substrate having a predetermined profile of curvature which is not present in the chemically-strengthened glass substrate prior to reverse ion-exchange.

2. The method of claim 1, wherein the provided thin glass glass substrate is produced by a tin float or fusion process.

3. The method of claim 1, wherein the provided thin glass glass substrate is produced by a tin float process.

4. The method of claim 1, wherein the ion-exchange medium which is presented is new being previously uncontaminated by host ion effluent.

5. The method of claim 1, which comprises adjusting the modification to glass substrate curvature during reverse ion-exchange by varying at least one of time, temperature, or configuration of the reverse ion-exchange medium.

6. The method of claim 5, which comprises adjusting the modification to glass substrate curvature by controlling the relaxation of compressive stress in said surface region during reverse ion-exchange by varying at least one of time, temperature, or configuration of the reverse ion-exchange medium.

7. The method of claim 5 or 6, which further comprises adjusting the modification to glass substrate curvature during reverse ion-exchange by varying at least one of a volume of the reverse ion-exchange medium, a species of reversing alkali ion contained in the reverse ion-exchange medium, a concentration of a species of reversing alkali ion contained the reverse ion-exchange medium, or the inclusion of an additive in the reverse ion-exchange medium which modifies the rate of reverse ion-exchange.

8. The method of claim 1, wherein the host alkali ions, the invasive alkali ions, or the reverse alkali ions are lithium ions, sodium ions, potassium ions, rubidium ions, caesium ions, or mixtures thereof.

9. The method of claim 1, wherein the physical characteristics of the treatment-advantaged surface region and opposing treatment disadvantaged surface region differ by one or more of tin ion contamination, annealing history, fluorination, ion-implantation, de-alkalization, metallic barrier film coating, ceramic-frit coating, and thermal bending geometry.

10. The method of claim 1, which further comprises measuring the chemically-strengthened glass substrate for curvature before applying the reverse ion-exchange medium to a treatment-advantaged surface region or a treatment-disadvantaged surface region thereof.

11. A method of producing a chemically-strengthened glass substrate, which comprises the following steps:
    providing a glass substrate having a chemical structure which contains host alkali ions having an average ionic radius situated in the surface regions thereof,
    presenting an ion-exchange medium which contains invasive alkali ions having an average ionic radius larger than the average ionic radius of the host alkali ions to surface regions of the substrate; and
    conducting ion-exchange while presenting the ion-exchange medium to the glass surface regions, thereby building compressive stress in the ion-exchanged surface regions and producing a chemically-strengthened glass substrate;
    said chemically-strengthened glass substrate having compressive stress which is asymmetric between a treatment-advantaged surface region and an opposing treatment disadvantaged surface region, and wherein said asymmetric compressive stress between opposing surface regions causes undesired curvature to the glass substrate;
    providing a reverse ion-exchange medium which contains alkali ions having an average ionic radius that is smaller than the average ionic radius of the invasive ions contained in the ion-exchange medium; and (1) presenting the reverse ion-exchange medium to only a treatment-advantaged surface region within at least an area of the opposing surface regions and conducting reverse ion-exchange while presenting the reverse ion-exchange medium to lessen the compressive stress in said surface region relative to the treatment-disadvantaged surface region opposing and thereby produce a chemically-strengthened substrate having less curvature than is present in the chemically-strengthened glass substrate prior to reverse ion-exchange, or (2) presenting the reverse ion-exchange medium to only one of a treatment-advantaged surface region or a treatment-disadvantaged surface region within at least an area of the opposing surface regions and conducting reverse ion-exchange while presenting the reverse ion-exchange medium to lessen the compressive stress in said surface region relative to the surface region opposing and thereby produce a chemically-strengthened substrate having a predetermined profile of curvature which is not present in the chemically-strengthened glass substrate prior to reverse ion-exchange;

wherein the reverse ion-exchange medium is an aqueous salt solution which is dried so as to coat a surface region of the glass substrate with a salt compound which contains reversing alkali ions.

* * * * *